(12) United States Patent
Miller

(10) Patent No.: US 9,912,192 B2
(45) Date of Patent: Mar. 6, 2018

(54) POWER DISTRIBUTION VISIBILITY IN DATA CENTER ENVIRONMENTS

(71) Applicant: FORTRUST, LLC, Denver, CO (US)

(72) Inventor: Bryon Wayne Miller, Denver, CO (US)

(73) Assignee: Iron Mountain Incorporated, Boston, MA (US)

( * ) Notice: Subject to any disclaimer, the term of this patent is extended or adjusted under 35 U.S.C. 154(b) by 56 days.

(21) Appl. No.: 14/746,449

(22) Filed: Jun. 22, 2015

(65) Prior Publication Data

US 2016/0370830 A1   Dec. 22, 2016

(51) Int. Cl.
| | |
|---|---|
| *G06F 1/26* | (2006.01) |
| *H02J 9/06* | (2006.01) |
| *G06F 1/28* | (2006.01) |
| *H02J 3/00* | (2006.01) |
| *H02J 13/00* | (2006.01) |

(52) U.S. Cl.
CPC ............ *H02J 9/061* (2013.01); *G06F 1/28* (2013.01); *H02J 3/006* (2013.01); *H02J 9/06* (2013.01); *H02J 13/001* (2013.01); *H02J 9/062* (2013.01); *Y02B 70/3291* (2013.01); *Y02B 90/222* (2013.01); *Y04S 20/12* (2013.01); *Y04S 20/248* (2013.01)

(58) Field of Classification Search
CPC .................................. G06F 1/26; H02J 9/061
USPC ................................................ 713/300, 320
See application file for complete search history.

(56) References Cited

U.S. PATENT DOCUMENTS

| | | | |
|---|---|---|---|
| 7,031,870 B2 | 4/2006 | Sharma et al. | |
| 7,461,273 B2 | 12/2008 | Moore et al. | |
| 8,595,515 B1 | 11/2013 | Weber et al. | |
| 8,601,287 B1 | 12/2013 | Weber et al. | |
| 8,610,438 B1 | 12/2013 | Sykora et al. | |
| 8,621,248 B1 | 12/2013 | Weber et al. | |
| 8,737,076 B2 | 5/2014 | Wright et al. | |
| 8,773,827 B2 | 7/2014 | Kiko | |
| 8,832,476 B2 | 9/2014 | Fan et al. | |
| 2002/0024332 A1* | 2/2002 | Gardner | H02J 3/14 324/103 R |
| 2004/0075343 A1 | 4/2004 | Wareham et al. | |
| 2012/0078430 A1* | 3/2012 | Fan | G06F 1/329 700/295 |
| 2012/0092811 A1 | 4/2012 | Chapel et al. | |
| 2012/0198253 A1* | 8/2012 | Kato | G06F 1/20 713/320 |
| 2014/0247537 A1* | 9/2014 | Nordin | H05K 7/1492 361/622 |

(Continued)

*Primary Examiner* — Nitin Patel
(74) *Attorney, Agent, or Firm* — Berg Hill Greenleaf & Ruscitti

(57) ABSTRACT

Methods and systems for managing, tracking, and displaying power usage information in connection with colocation datacenters are described. In particular, one or more current transformers determine an amount of current associated with breaker positions of a breaker panel. The current readings may then be used to construct one or more virtual circuits. Access to the current and power readings associated with the virtual circuit is provided to clients via a communication network. Additionally, the current readings may be utilized to track actual current and/or power use in conjunction with one or more client allocated amounts of power.

9 Claims, 18 Drawing Sheets

(56) References Cited

U.S. PATENT DOCUMENTS

| | | | |
|---|---|---|---|
| 2014/0258052 A1* | 9/2014 | Khuti | G06Q 10/087 705/28 |
| 2014/0366139 A1 | 12/2014 | Khuti et al. | |
| 2015/0028848 A1* | 1/2015 | Lynch | G01R 21/00 324/76.11 |

* cited by examiner

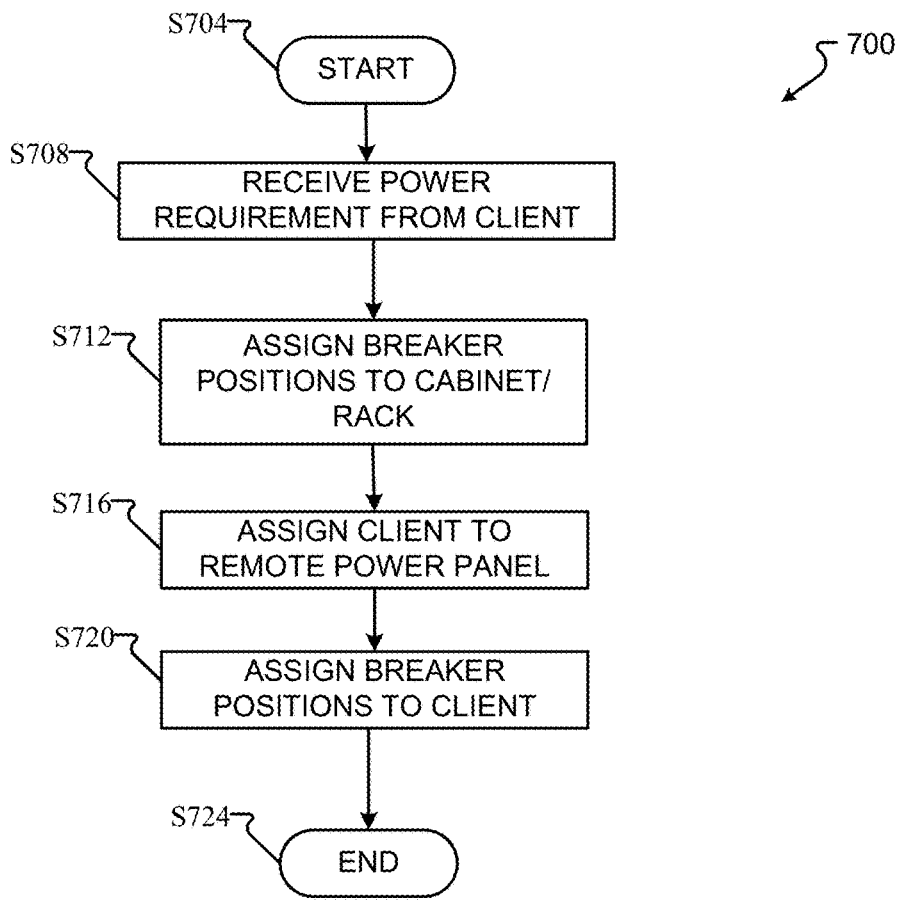
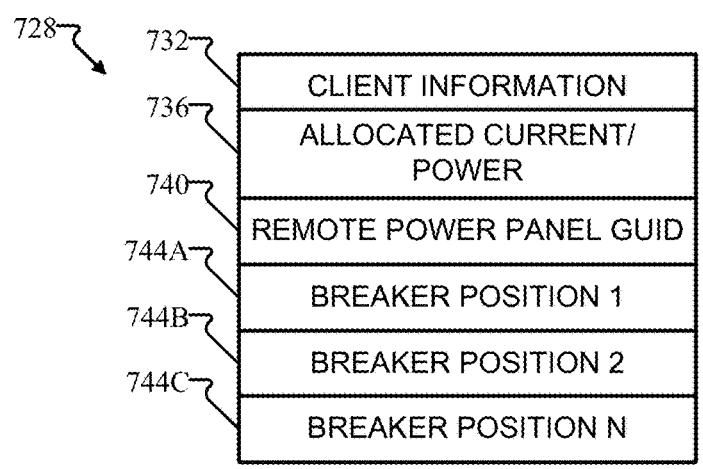
FIG. 7

REMOTE POWER PANEL <GUID> A SIDE

POWER SOURCE INFORMATION

| PANEL FED FROM | KW CAP. | KW AL. | KW USED |
|---|---|---|---|
| SWITCH 1-GUID | 106.25 | 182.40 | 103.53 |
| UPS 1-GUID | 337.50 | 351.27 | 195.05 |

PANEL POWER AVAILABLE

| KVA ALLOWED | 40.0 |
|---|---|
| KVA BEING USED | 18.9 |
| KVA ALLOCATED | 30.2 |
| KVA AVAIL (USAGE) | 21.1 |
| KVA AVAIL (A) | 9.8 |

POWER USE INFORMATION

| % OF ALLOCATED WATTS USED | 62.5 | |
|---|---|---|
| AMPS USED BY PHASE | | |
| A | B | C |
| 75.7 | 39.4 | 42.3 |

| BKR CAB/RACK | CLIENT | TYPE | P(W) | AL(W) | %USED | AMPS | WRN | ALM | Ph | BKR CAB/RACK | CLIENT | TYPE | P(W) | AL(W) | %AL | AMPS | WRN | ALM | Ph |
|---|---|---|---|---|---|---|---|---|---|---|---|---|---|---|---|---|---|---|---|
| 01 GUID-01 | A | R120/20 | 300 | 960 | 31.3 | 2.5 | ○ | ○ | A | 02 GUID-02 | A | R120/20 | 1296 | 960 | 135 | 10.8 | ● | ○ | A |
| 03 GUID-03 | A | R120/20 | 576 | 960 | 60.0 | 4.8 | ○ | ○ | B | 04 GUID-04 | B | R120/20 | 660 | 960 | 68.8 | 5.5 | ○ | ○ | B |
| 05 GUID-05 | B | R120/20 | 756 | 960 | 78.8 | 6.3 | ○ | ○ | C | 06 GUID-06 | B | R120/20 | 684 | 960 | 71.3 | 5.7 | ○ | ○ | C |
| 07 GUID-07 | C | R120/20 | 1272 | 960 | 132.5 | 10.6 | ● | ○ | A | 08 GUID-08 | C | R120/20 | 672 | 960 | 70 | 5.7 | ○ | ○ | A |
| * | * | * | * | * | * | * | * | * | * | * | * | * | * | * | * | * | * | * | * |
| * | * | * | * | * | * | * | * | * | * | * | * | * | * | * | * | * | * | * | * |
| 37 GUID-37/39 | M | R208/30 | 516 | 960 | 53.8 | AMPS | ○ | ○ | A | 38 GUID-38 | B | R120/20 | 564 | 960 | 56.7 | 4.7 | ○ | ○ | A |
| 39 | | | | | | | | | | 40 GUID-40 | B | R120/20 | 1296 | 960 | 135 | 10.8 | ● | ○ | B |
| 41 GUID-41 | N | R120/20 | 972 | 960 | 101.3 | AMPS | ● | ○ | C | 42 GUID-42 | R | R120/20 | 444 | 960 | 46.3 | 3.7 | ○ | ○ | C |

FIG. 10

POWER DISTRIBUTION VISIBILITY IN DATA CENTER ENVIRONMENTS

FIELD OF THE INVENTION

The invention relates to a system and method for determining and recording power usage and distribution requirements within colocation datacenter environments, and more particularly, to a system and method in which data relating to these requirements can be used for datacenter functions including datacenter operating requirements and for dynamic display of information to users of the colocation datacenters regarding a status of user equipment installed at the datacenters and power resources consumed.

BACKGROUND

Datacenters are facilities that house computer systems and their associated components. There are generally two classifications of datacenters, a purpose-built datacenter and a colocation data center. Purpose-built datacenters, which may also be referred to as an in-house data centers, are typically use specific centers and often require an entity to manage all aspects of the datacenter. For example, the entity managing a purpose-built data center is responsible for not only the information technology (IT) equipment within the datacenter, but also the equipment required to run the datacenter. Such equipment may include equipment necessary to provide power to the IT equipment, as well as the equipment necessary to cool the IT equipment. Often, purpose-built datacenters require a substantial capital investment and are therefore generally suited for large companies capable of managing the entirety of such a datacenter. A colocation datacenter differs from a purpose-built datacenter in that the colocation datacenter provides space, power, and cooling, but the colocation datacenter typically does not provide IT equipment. Users of colocation data centers therefore install their own equipment within the colocation data center. A colocation datacenter user may rent space within the datacenter but relies solely on the entity managing the datacenter to provide power and cooling. Although the entity managing the colocation datacenter is not responsible for the user's IT equipment, the colocation datacenter is responsible for providing reliable power, cooling, physical security, and fire protection.

Previous colocation datacenter pricing models charged users based on an amount of space occupied. In other words, a "real estate" model was used in which users were charged based on the amount of space occupied by the user's equipment installed. However, such a "real estate" model did not accurately represent the resources required to service users with respect to power and cooling. As IT systems become progressively smaller in size due to advances in manufacturing technology, more computing capability can occupy the same amount of physical space. Therefore, more power and more cooling is often required because there is a much greater density of equipment components that occupy the same space as compared to previous times in which IT equipment components were of much larger size. Because power and cooling requirements were not factored into the real estate models, true operating costs per user could not be accurately assessed and charged. More recently, colocation datacenter pricing models typically include power as a measured operating cost parameter. A pricing model for a colocation datacenter including power requirements may be used to provide a rough estimation of an amount of cooling required.

However, two issues arise when relying on a power requirement as a key component of a pricing model. The first issue arises because clients who are paying for power tend to be more cognizant of their own power use and often wish for some form of verification between the power utilized and the power they are paying for. The second issue relates to the method by which colocation datacenters provide and track power. That is, issues may arise when a colocation datacenter over-allocates power based on a perceived power use of the client. Accordingly, there is a need for a system and/or method to instantaneously track client power use, provide such tracking information to a user in real-time, and to further provide a power allocation system capable of tracking power usage and power allocation information.

SUMMARY

Embodiments of the present invention provide a system and method capable of tracking power usage while also tracking and recording power allocation information. Power allocation means an indication of an amount of power that has been purchased or allocated to a user and is maintained and associated with various pieces of equipment within the colocation datacenter power distribution system. More particularly, power usage is tracked for an uninterruptable power supply (UPS), one or more transfer switches, and one or more remote power panels of a power distribution system. Further, an amount of allocated power may be tracked and recorded such that the colocation datacenter minimizes chances of associated power over allocation.

In accordance with embodiments of the present disclosure, a method of determining and recording power usage and distribution requirements within a datacenter is provided, the method including measuring, by a first current sensor, a first current associated with a first breaker position in a breaker panel of the datacenter, measuring, by a second current sensor, a second current associated with a second breaker position in the breaker panel of the datacenter; generating a first value for a first virtual circuit derived from the first current and the second current, comparing the first value for the first virtual circuit to a selected first virtual circuit threshold, measuring, by a third current sensor, a third current associated with a third breaker position in the breaker panel of the datacenter, generating a second value for a second virtual circuit derived from the third current, summing the first value for the first virtual circuit and the second value for the second virtual circuit, and outputting the sum of the first value for the first virtual circuit and the second value for the second virtual circuit to a display of a computing device. In some embodiments, the method may further include generating the first virtual circuit based on the first breaker position and the second breaker position in the breaker panel and/or generating at least one indication when the first value for the virtual circuit exceeds the selected first virtual circuit threshold. Further, the sum of the first value for the first virtual circuit and the second value for the second virtual circuit may be communicated across a communication network. The method may also include measuring, by the first current sensor, a fourth current associated with the first breaker position in the breaker panel of the datacenter, measuring, by the second current sensor, a fifth current associated with the second breaker position in the breaker panel of the datacenter, generating a third value for the first virtual circuit derived from the fourth current and the fifth current, measuring, by the third current sensor, a sixth current associated with the third breaker position in the breaker panel of the datacenter, generating a fourth value for the second virtual circuit derived from the sixth current, summing the third value for the first virtual circuit and the fourth value for the second virtual circuit, and providing the sum of the third value for the first virtual circuit and the fourth value for the second virtual circuit to the display of the computing device, wherein the sum of the first value for the first virtual circuit and the second value for the second virtual circuit and the sum of the third value for the first virtual circuit and the fourth value for the second virtual circuit are displayed at a same time. Further, the method may include receiving at least one of temperature and humidity information from at least one sensor; and providing the received at least one of temperature and humidity information to the display of the computing device.

In accordance with another embodiment of the invention, a method of determining and recording power usage and distribution requirements within a datacenter comprising: measuring, by a first current sensor, a first current associated with a breaker position in a first breaker panel of the datacenter; generating a first value for a first virtual circuit derived from the first current; comparing the first value for the first virtual circuit to a selected first virtual circuit threshold; measuring, by a second current sensor, a second current associated with a breaker position in a second breaker panel of the datacenter, wherein the first breaker panel of the datacenter and the second breaker panel of the datacenter are electrically connected to a power distribution element; generating a second value for a second virtual circuit derived from the second current; comparing the second value for the second virtual circuit to a selected second virtual circuit threshold; generating an allocation value for the power distribution element, the allocation value derived from at least the selected first virtual circuit threshold and the selected second virtual circuit. In some embodiments, the method may include comparing the allocation value for the power distribution element to a selected power distribution element threshold. Further, the power distribution element may be a first transfer switch and/or an uninterruptable power supply (UPS). The method may further include measuring, by a third current sensor, a third current associated with a breaker position in a third breaker panel of the datacenter; generating a third value for a third virtual circuit derived from the third current; comparing the third value for the third virtual circuit to a selected third virtual circuit threshold; measuring, by a fourth current sensor, a fourth current associated with a breaker position in a fourth breaker panel of the datacenter; generating a fourth value for a fourth virtual circuit derived from the fourth current; comparing the fourth value for the fourth virtual circuit to a selected fourth virtual circuit threshold; generating an allocation value for a second transfer switch, the allocation value derived from at least the selected third virtual circuit threshold and the selected fourth virtual circuit; generating an allocation value for an uninterruptable power supply (UPS), the allocation value for the UPS derived from at least the third predetermined threshold and the sixth predetermined threshold; and comparing the allocated value for the UPS to a seventh predetermined threshold for the UPS.

Yet still, in accordance with another embodiment of the invention, a system is provided, the system including a breaker panel receiving power from at least one power distribution element, said at least one breaker panel including a plurality of breaker positions; a first current sensor residing at a first breaker position of the plurality of breaker positions in the breaker panel; a second current sensor residing at a second breaker position of the plurality of breaker positions in the breaker panel; and a data center infrastructure manager, wherein the data center infrastructure manager generates a first value for a first virtual circuit derived from a first current measurement provided by the first current sensor, wherein the data center infrastructure manager generates a second value for a second virtual circuit derived from a second current measurement provided by the second current sensor, wherein the data center infrastructure manager generates a third value by summing the first value for the first virtual circuit and the second value for the second virtual circuit, and wherein the data center infrastructure manager outputs the third value to a display of a computing device. In some embodiments, the system may include a communication network, wherein the third value is provided over a communication network to a second computing device. In some embodiments, the communication network includes a portion of a public communication network. Further, in some embodiments, the system includes a first rack including a second computing device, wherein the first current measurement is for a first electrical circuit within the rack and the second current measurement is for a second electrical circuit within the rack. In some embodiments, the data center infrastructure manager may provide the first value and the second value to the second computing device over the communication network, wherein the first value, the second value, and the third value are provided in real-time. The system may include a third current sensor residing at a third breaker position in the breaker panel, wherein the first value for the first virtual circuit is derived from the first current measurement and the third current measurement. In some embodiments, the system may further include a second breaker panel, wherein the at least one breaker panel and the second breaker panel are electrically connected to the power distribution element; and, a third current sensor residing at a breaker position in the second breaker panel, wherein the data center infrastructure manager compares the first value for the first virtual circuit to a first predetermined threshold, wherein the data center infrastructure manager generates a fourth value for a third virtual circuit derived from a current measurement provided by the third current transformer and compares the fourth value for the third virtual circuit to a second predetermined threshold, and wherein the data center infrastructure manager generates an allocation value for the power distribution element derived from at least the first predetermined threshold and the second predetermined threshold. In some embodiments, the power distribution element may be a transfer switch and/or an uninterrupted power supply (UPS). The system may further include a second transfer switch; a third breaker panel electrically connected to the second transfer switch; and an UPS, wherein the first transfer switch and the second transfer switch are electrically connected to the UPS and wherein an allocation value for the UPS is derived from the allocation value for the first transfer switch and an allocation value for the second transfer switch. Further, the system may include at least one sensor providing at least one of temperature and humidity information to the data center information manager, wherein the datacenter information manager provides the at least one of the temperature and humidity information to the display of the computing device.

Further yet, in accordance with another embodiment of the invention, a non-transient computer readable medium having stored thereon instructions that, when executed, cause a processor to perform a method, the instructions associated with a method of communicating power usage and distribution requirements within a datacenter to a consumer having data processing assets housed within said datacenter, said instructions including instructions for measuring, by a first current sensor, a first current associated with a first breaker position in a breaker panel of the datacenter, instructions for measuring, by a second current sensor, a second current associated with a second breaker position in the breaker panel of the datacenter, instructions for generating a first value for a first virtual circuit derived from the first current and the second current, instructions for comparing the first value for the first virtual circuit to a selected first virtual circuit threshold, instructions for measuring, by a third current sensor, a third current associated with a third breaker position in the breaker panel of the datacenter, instructions for generating a second value for a second virtual circuit derived from the third current, instructions for summing the first value for the first virtual circuit and the second value for the second virtual circuit, and instructions for outputting the sum of the first value for the first virtual circuit and the second value for the second virtual circuit to a display of a computing device. The computer readable medium may further include instructions for generating the first virtual circuit based on the first breaker position and the second breaker position in the breaker panel. In some embodiments, the computer readable medium may have further instructions for generating at least one indication when the first value for the virtual circuit exceeds the selected first virtual circuit threshold. In some embodiments, the computer readable medium may further include instructions for receiving at least one of temperature and humidity information from at least one sensor, and instructions for providing the received at least one of temperature and humidity information to the display of the computing device. In some embodiments, the breaker panel of the datacenter is electrically connected to a first device, and instructions for generating an allocation value for the first device, the allocation value derived from at least the sum of the first value for the first virtual circuit and the second value for the second virtual circuit. Further, in some embodiments the computer readable medium may include instructions for comparing the allocation value for the first device to a selected first device threshold. In some embodiments, the first device may be one of a first transfer switch and/or an uninterruptable power supply. Further yet, in accordance with another embodiment of the invention, a system is provided, the system including a processor, memory, a communication interface, and one or more instructions stored in the memory, wherein the one or more instructions, when executed by the processor, are operable to receive a current reading corresponding to a breaker position in a breaker panel, the breaker panel receiving power from a power distribution element, generate a logical circuit based on the received current reading and a predetermined voltage, wherein the logical circuit includes one or more of a current value for the logical circuit, a power value for the logical circuit, and an allocation value for the logical circuit, wherein the allocation value for the logical circuit is at least one of a power allocation and a current allocation, output at least one of the current value for the logical circuit, the power value for the logical circuit, and the allocation value for the logical circuit to a display of a first computing device, and output, via the communication interface, at least one of the current value for the logical circuit, the power value for the logical circuit, and the allocation value for the logical circuit to a second computing device. Further, in some embodiments, the system may include instructions operable to receive a second current reading corresponding to a second breaker position in the breaker panel, and generate the first logical circuit based on the received second current reading. In some embodiments, the communication network is a public network. In some embodiments, the system may include instructions operable to: receive a second current reading corresponding to a breaker position in a second breaker panel, generate a second logical circuit based on the received second current reading, and generate a power utilization value for the power distribution element based on the power value for the second logical circuit and the power value for the first logical circuit. In some embodiments, the system may include instructions to generate an allocation value for the power distribution element based on a power allocation value for the second logical circuit and the power allocation value for the first logical circuit. In some embodiments, the system may include instructions to compare the allocation value for the power distribution element to the power utilization value for the power distribution element, and output, via the communication interface, an indication when the power utilization value for the power distribution element exceeds the allocation value for the power distribution element. Yet, in some embodiments, the system may include instructions to receive a third current reading corresponding to a breaker position in a third breaker panel, generate a third logical circuit based on the received third current reading, receive a fourth current reading corresponding to a breaker position in a fourth breaker panel, generate a fourth logical circuit based on the received fourth current reading, and generate a fourth power utilization value for a second power distribution element based on a power value for the third logical circuit and a power value for the fourth logical circuit, and generate a fifth power utilization value for a third power distribution element based on the power utilization value for the second power distribution element and the power utilization value for the power distribution element. In some embodiments, the power distribution element is a transfer switch and/or an uninterruptable power supply. In some embodiments, the second power distribution element is another transfer switch and the third power distribution element is an uninterruptable power supply. In some embodiments, the current reading is provided by at least one current sensor. In some embodiments, the system includes instructions operable to generate a graphical user interface including one or more of a current value for the logical circuit, the power value for the logical circuit, and the allocation value for the logical circuit. And, in some embodiments, the system includes instructions to associate a unique identifier to the logical circuit.

These and other advantages and features of the invention described above in the summary will be apparent from the disclosure of the invention(s) contained herein. The embodiments, objectives, and configurations described herein are neither complete nor exhaustive. As will be appreciated, other embodiments of the invention are possible using, alone or in combination, one or more of the features set forth above or described in detail below. Further, the summary of the invention is neither intended nor should it be construed as being representative of the full extent and scope of the invention. The invention is set forth in various levels of detail in the summary, as well as in the attached drawings and the detailed description of the invention. No limitation as to the scope of the invention is intended with respect to either the inclusion or non-inclusion of elements, components, etc. set forth in the summary of the invention. Additional aspects of the present invention will become more readily apparent from the detailed description, particularly when taken together with the drawings.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the invention is considered to include a tangible storage medium and prior art-recognized equivalents and successor media, in which the software implementations of the present invention are stored.

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

BRIEF DESCRIPTION OF THE DRAWINGS

Those of skill in the art will recognize that the following description is merely illustrative of the principles of the disclosure, which may be applied in various ways to provide many different alternative embodiments. It should be understood that the drawings are not necessarily to scale and in certain instances, details that are not necessary for an understanding of the disclosure or that render other details difficult to perceive may have been omitted.

FIG. 7 is a flow diagram depicting an example method for assigning a client to one or more breaker positions and a resulting data structure in accordance with the invention;

FIG. 10 illustrates an example of a graphical user interface displaying details of a remote power panel and one or more logical circuits in accordance with the invention;

DETAILED DESCRIPTION

Figure 1:
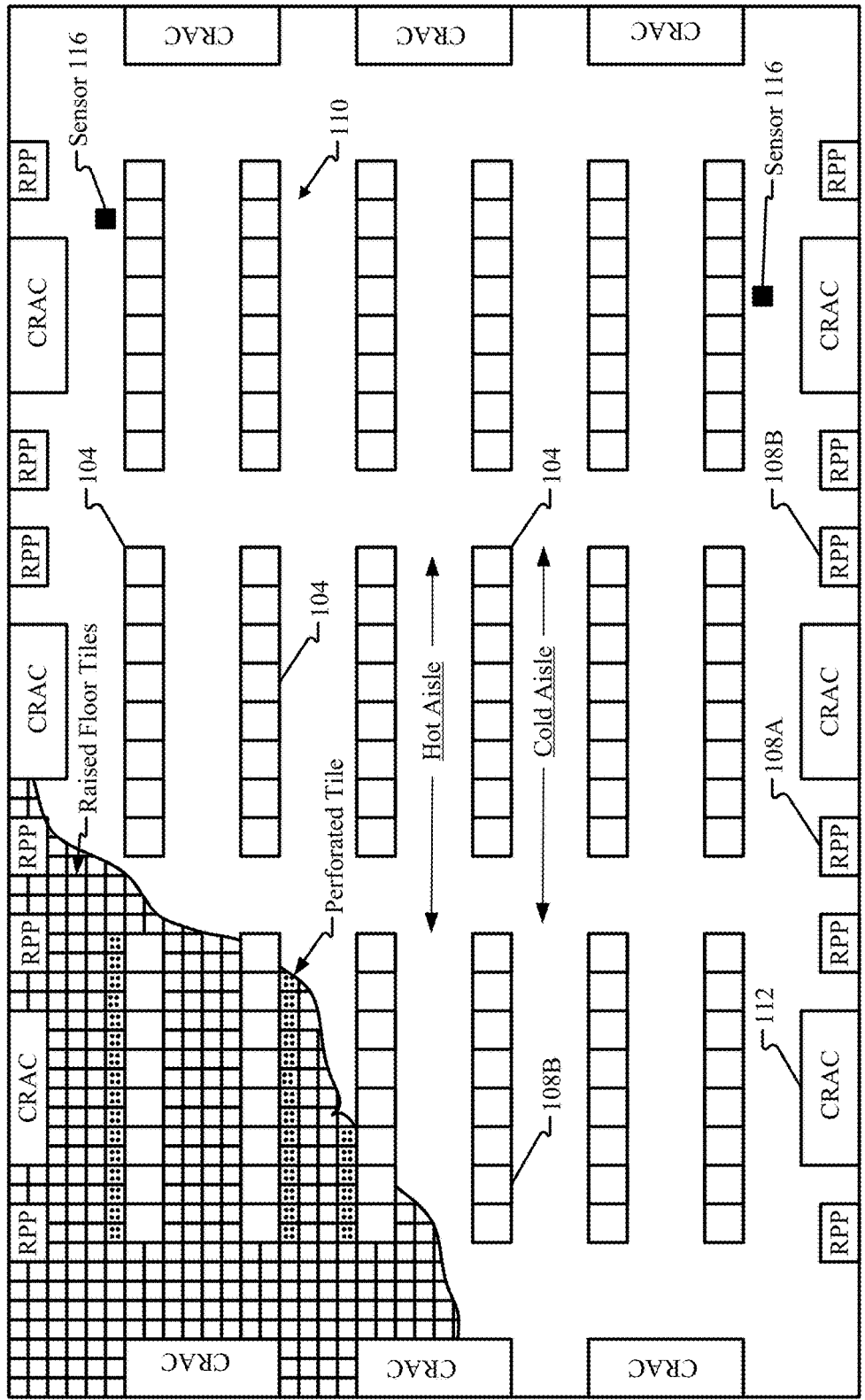
FIG. 1 is a schematic diagram of an example data center layout.

With reference first to FIG. 1, a simplified view of a data center room 100 is shown. The terms "data center" and "data center room" are generally meant to denote a room or other space and are not meant to limit the invention to any specific type of room where data is communicated or processed, nor should it be construed that the use of the terms "data center" or "data center room" limits the invention in any respect other than how it has been described herein above. The terms "data center" and/or "data center room," as referenced throughout the present disclosure, may also denote any facility used to house computer systems and associated components, such as telecommunications and storage systems. In addition, the "data center" and/or the "data center room" generally includes redundant or backup power supplies, redundant data communications connections, environmental controls (e.g., air conditioning, fire suppression), and various security devices. A colocation facility, also known as a "colo" is a specific type of data center facility in which a business can rent space for servers and other computing hardware. That is, colocation facilities provide space, power, cooling, and physical security for the server, storage, and networking equipment of various clients—and provide access to a variety of telecommunications and network service providers—with a minimum of cost and complexity. Accordingly, a colocation facility is tasked with not only providing space, power, cooling, and physical security, but the colocation facility must also maintain such facility to minimize, or eliminate, any service downtimes.

The data center room 100 depicted in FIG. 1 represents a generalized illustration of a space utilized in a colocation data facility. The data center room 100, which may be one of many data center rooms in a colocation facility, may include any number of cabinets/racks 104, and various other apparatuses known to be housed in data centers. In addition to the cabinets/racks 104, the data center room 100 may also include one or more computer room air conditioning (CRAC) units 112, one or more remote power panels 108A-108B, and one or more sensors 116 used to sense and/or measure environmental aspects of the data center room 100 and/or a portion of the data center room 100. Although the data center room 100 is illustrated as containing three rows of cabinets/racks 104, twelve CRAC units 112, and twelve remote power panels 108, it should be understood that the data center room 100 may include any number of cabinets/racks 104, for instance, 100 racks, CRAC units 112, and remote power panels 108. The depiction of rows of cabinets/racks 104, twelve CRAC units 112, and twelve remote power panels 108, is thus for illustrative and simplicity of description purposes only and is not intended to limit the data center room 100 in any respect.

The data center room 100 is depicted as having multiple cabinets/racks 104 aligned in substantially parallel rows separated by access aisles. Each cabinet/rack 104 may include multiple client computing devices. For example, the client computing devices may include computers, servers, monitors, hard drives, disk drives, etc., designed to perform various operations, such as, computing, switching, routing, displaying, etc. The client computing devices may include subsystems, for example, processors, micro-controllers, high-speed video cards, memories, semi-conductor devices, and the like to perform these functions; in the performance of these electronic functions, the subsystems and therefore the computing devices, generally dissipate relatively large amounts of heat. Because the cabinets/racks 104 generally include many client computing components, the cabinets/racks 104 may require substantially large amounts of cooling resources to maintain the subsystems and the components generally within predetermined operating temperature ranges.

As illustrated in FIG. 1, the cabinets/racks 104 are shown as being positioned on a raised floor covered by floor tiles. FIG. 1 further illustrates, via the section break, that the data center room 100 includes such raised floor and tiles, and further all, or substantially all, of the data center room 100 includes such raised floor. A plurality of wires and communication lines (not shown) may be located in a space beneath the raised floor tile. The space below the raised floor tile may also function as a plenum for delivery of cooling airflow from the CRAC units 112 to the cabinets/racks 104. The cooled airflow may be delivered from the space to the cabinets/racks 104 through a plurality of vent tiles, or perforated tiles, located in front of some or all of the racks in the access aisles. The number of perforations in front of the cabinet/rack 104 may correspond to the amount of heat generated by the client computing equipment within the rack 104. That is, the tiles in front of some of the cabinets/racks 104 may include more perforations than other tiles in order to increase the amount of cooled air delivered to the cabinet/rack 104. The access aisle, including the perforated tiles for cool air delivery, is generally referred to as a cold aisle while aisles in between cold aisles are generally referred to as hot aisles. One or more temperature sensors 116 may also be positioned in the space below the raised floor tiles and/or at a standard height above the raised floor tiles to detect the temperatures of the airflow supplied by the CRAC units 112 as well as the general operating temperature of the data center room 100.

The CRAC units 112 generally operate to receive heated airflow from the data center room 100, cool the heated airflow, and deliver the cooled airflow to the space below the raised floor tiles. The CRAC units 112 may comprise vapor-compression type air conditioning units, water-chiller type air conditioning units, etc. In an ideal system, the airflow delivered to the cabinets/racks 104 includes only the cooled airflow supplied directly by the CRAC units 112 and the airflow returning into the CRAC units 112 includes only the airflow heated by the client computing components in the cabinets/racks 104. Further, the CRAC units 112 may further condition the cooled air such that the cooled air is delivered having a predetermined relative humidity.

As previously discussed, the data center room 100 is depicted as having multiple cabinets/racks 104 aligned in substantially parallel rows separated by access aisles. In colocation facilities, each cabinet/rack 104 is generally assigned to a client and the client retains control over the contents of the cabinet/rack 104. Accordingly, each cabinet/rack 104 may be secured by a client such that a key or combination is required to access the internals of the cabinet/rack 104 and/or a general area where the cabinet/rack 104 is located or secured. In many colocation data centers, the operator of the data center does not have any knowledge of or access to the cabinet/rack 104 contents. For instance, the operator of the colocation data center has little knowledge of what client computing devices will be installed in the cabinet/rack 104, the power consumed by each client computing device, or exactly how much cooling may be required to keep the client's computing device in the client's assigned cabinet/rack 104 cool.

Rather, in accordance with some embodiments of the present disclosure, the colocation data center operator provides an agreed upon, or contractually obligated, amount of power to a client. That is, the colocation data center operator may, as part of a contract, provide enough cooling such that the cooled airflow to the client's computing devices is delivered at a particular temperature and/or a temperature of the data center room 100, as measured at a standardized height, does not exceed a predetermined temperature. Accordingly, the colocation data center operator and the client may agree that the power and cooling will be provided acceding to the terms of a service level agreement and that the data center operator and the client will not exceed those terms. Although the data center operator may be contractually obligated to provide a specified amount of power and a specified amount of cooling, rarely do the client's computing devices operate at the agreed upon power and cooling requirements. Rather, the client's computing devices often require less power and less cooling than the agreed upon contractual amount. Stated another way, the agreed upon contractual amount of power and cooling generally functions as a maximum amount of power and cooling that the data center operator will need to provide. Therefore, the data center operator is tasked with balancing the instantaneous needs of the clients with the need to operate in an efficient manner. In accordance with the invention, such balancing may be achieved by proactively monitoring the power distribution system and the cooling systems.

Figure 2:
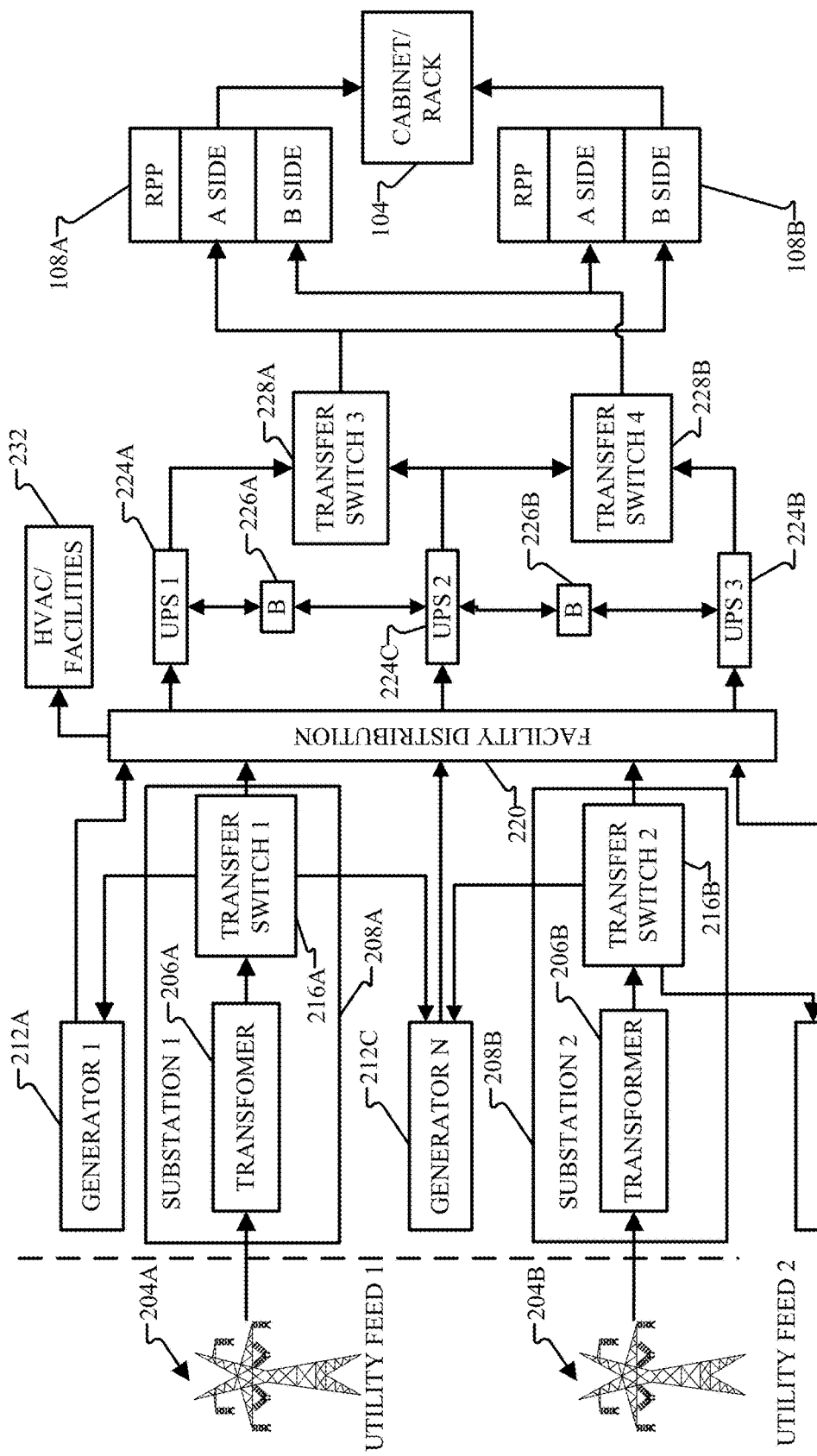
FIG. 2 is a schematic diagram of a power distribution system.

FIG. 2 depicts a power distribution system in accordance with the invention. The power distribution system, as illustrated in FIG. 2, may be designed to meet a specific operating threshold, provide a certain level of redundancy, and/or may be designed such that routine maintenance does not impact client computing devices in the client's cabinet/rack 104. The power distribution system may include one or more utility feeds 204A-B coming from differing power providers or differing power provider substations. Each utility feed 204A-B may then enter the data center, such as the colocation facility, as depicted by the dashed line. Each utility feed 204A-B may then enter a substation 208A-B located within the data center. The substations 208A-B generally step down the voltage of the provider utility feed from a high voltage to a lower voltage that is more compatible with a data center's power distribution system equipment and wiring. For example, each utility feed 204A-B, having a voltage of 13.2 kV, may enter a respective onsite substation 208A-B such that the voltage is stepped down to 480 volts using a respective transformer 206A-206B, such as a 2500 VA transformer for example.

Subsequently, the power from each of the respective substations may be conditioned to reduce sags, surges, swells, spikes, and other electrical noise, and may be provided to a respective transfer switch 216A-B. Further, one or more generators 212A-C may be in communication with a respective transfer switch 216A-B. In accordance with embodiments of the present disclosure, transfer switches 216A-B are automatic transfer switches and are provided such that a respective generator 212 may provide temporary electrical power in the event one of the utility feeds 204A-B fails. That is, each of the transfer switches 216A-B determines a power condition associated with a respective utility feed 204A-B; should the power condition not meet a respective threshold, the respective transfer switch 204A-B may cause a respective generator 212A-C to initiate power generation. The respective generators 212A-C may then provide power to the facility via facility distribution 220. For additional safety and redundancy, the generators 208A-C may be provided in an N+1 configuration and one or more generators 212 may be configured as a backup generator for a currently utilized generator.

The power out of each transfer switch 216 may be distributed via a plurality of distribution runs, as illustrated by facility distribution 2202, to one or more uninterruptible power supply (UPS) units 224A-C and other HVAC and facilities equipment 232. HVAC and facilities equipment may generally include chillers for keeping the data center cool and to one or more pumps for supplying cooled water, or glycol, to each of the CRAC units 112. Further, other HVAC equipment may include air filtering, air handling, humidification, and dehumidification equipment to ensure that the air supplied to the client computing devices, via the perforated floor tiles, for example, is clean and free of corrosive airborne compounds which may impact the overall health and safety of the client computing equipment. Lastly, the HVAC and facilities equipment may service the general power and plumbing needs of the data center and offices, if any.

UPS units 224A-C, together with one or more batteries 226A-B, provide an uninterruptable source of power in the event one of the utility feeds 204A-B and/or one of the generators 212A-C fails or during times when power is switched at the transfer switches 216A-B. In a typical implementation, the UPS units 224A-C range in size from 750 kVA to 1000 kVA, although other sizes are certainly contemplated. Power out of the UPS units 224A-C is then provided to transfer switches 228A-B. Similar to the generators 212A-C, for additional safety and redundancy, the UPS units 224A-C may be provided in an N+1 or 2N+1 configuration.

In accordance with embodiments of the present disclosure, transfer switches 228A-B are static transfer switches and are provided in a manner such that a respective UPS unit 224 is configured to provide power to one side of the remote power panel 108A-B. That is, for purposes of redundancy, power provided to a cabinet/rack 104 may be provided in a redundant manner having an A side and a B side. Since many client computing devices, such as servers, storage devices, and networking equipment, are configured with dual power supplies for redundancy, failover, and to increase the uptime associated with such devices, one power supply is generally connected to the A side and one power supply is connected to the B side. Accordingly, client computing equipment may be powered by an A side and a redundant B side when configured in this manner. Thus, to achieve the highly redundant manner of distributing power, a transfer switch, such as transfer switch 228A may provide power to the A side of the remote power panel 108A and to the A side of the remote power panel 108B. Similarly, the transfer switch 228B may provide power to the B side of remote power panel 108B and to the B side of remote power panel 108A. Subsequently, the cabinet/rack 104 may be fed from two remote power panels 108A-B having different sources of primary and second power.

Figure 3:
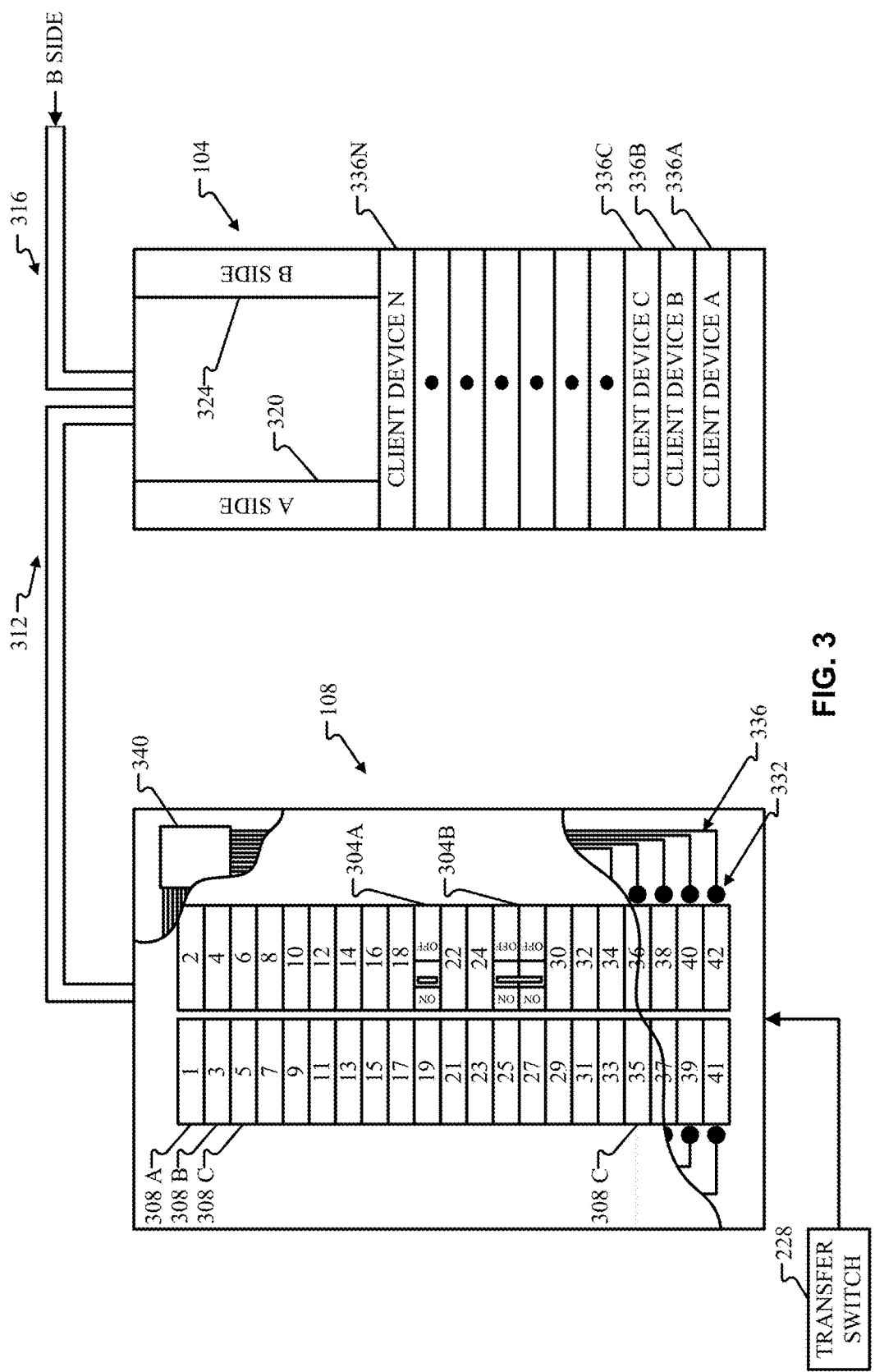
FIG. 3 illustrates an example remote power panel and cabinet/rack configuration.

FIG. 3 illustrates a remote power panel 108 and a cabinet/rack 104 configuration in accordance with some embodiments of the present disclosure. As previously discussed, a transfer switch 228 may provide the remote power panel 108 with power for distribution to a cabinet/rack 104. The transfer switch 228 may be capable of providing any voltage to the remote power panel 108; however, typical voltages provided to the remote power panel 108 include three-phase 208 and single phase 120. The remote power panel 108 is illustrated as having a total of forty-two breaker positions 308, where each breaker position 308 is associated with at least one breaker, or circuit breaker, such as breakers 304A and 304B for example. Although the remote power panel 108 may have a breaker 304 occupying each breaker position 308, in some instances, not all breaker positions 308 will be filled with a breaker 304.

Each of the breakers 304 may be of a different capacity and/or type. For example, breaker 304A, occupying a single breaker position (breaker position 20), may be a single pole 15 A amp or 20 amp breaker (also referred to as 15 A or 20 A) capable of providing 15 amps and/or 20 amps at a voltage of 120 volts. Similarly, breaker 304B may be a two pole breaker occupying two breaker positions (breaker positions 26 and 28) may be a 30 A breaker capable of providing 30 amps at a voltage of 208 volts AC. In some remote power panels 108, the breaker 304B at positions 26 and 28 may be capable of providing 30 amps at a voltage of 240 volts AC. Although not shown, in some remote power panels 108 capable of providing three-phase power, a breaker 304 may be a three pole breaker and occupy three breaker positions 308.

As previously referenced, each of the breaker positions may be numbered; that is, in accordance with conventional numbering schemes, the breaker positions on the left side of the remote power panel 108 may be numbered using odd numbers, such as 1, 3, 5, etc. . . . , while the breakers on the right side of the remote power panel 108 may be numbered using even numbers, such as 2, 4, 6, etc. In addition, each breaker position may include, or otherwise be assigned, an identifier that uniquely identifies the breaker position within the data center. For example, the breaker position may include a globally unique identifier (guid), such as a text string that is based on a remote power panel in which the breaker resides, and/or the location of the breaker within the remote power panel 108. Alternatively, or in addition, the breaker position ID may simply refer to the assigned breaker position in accordance with a conventional numbering scheme. Further, each of the breaker positions may be associated with a phase of the incoming AC power in order to supply a specified amount of power for a circuit. For example, where power supplied from the transfer switch 228 includes three phases, each phase being 120 degrees apart, conventional power distribution schemes configure power panels, or breaker boxes, such that every third row is associated with the same phase of power. More specifically, breaker positions 1 and 2 may be associated with phase A, breaker positions 3 and 4 may be associated with phase B, breaker positions 5 and 6 may be associated with phase C, breaker positions 7 and 8 may be associated with phase A, and breaker positions 9 and 10 may be associated with phase B and so on and so forth. Accordingly, to achieve a 208 volt AC circuit, a breaker, such as breaker 304B, may be placed in breaker positions 26 and 28 utilizing phase A and phase B. In such a configuration, the phase to phase voltage is 208 volts AC. Additionally, a single breaker, such as breaker 304A, may be placed in a single breaker position to achieve a 120 volt AC circuit. Power is then supplied to the circuit from the breakers 304 in the remote power panel 108 to the cabinet/rack 104 via one or more of the circuit wirings 312. Since rack/cabinet 104 may provide redundant power capabilities, for example A side power 320 and B side power 324, such that the client computing devices 336 may be connected to both sides of power, the remote power panel 108 may be configured to supply the A side power to the rack/cabinet 104 as illustrated. Although the remote power panel 108 is illustrated as containing 42 breakers and forty-two breaker positions, the remote power panel 108 may contain more or less breakers and breaker positions. For example, the remote power panel 108 may include 84 breaker positions. Alternatively, or in addition, the remote power panel 108 depicted in FIG. 3 is one half of a remote power panel 108. That is, as previously discussed, the remote power panel 108 may be capable of receiving power from a primary power source, such as transfer switch 228A and second source, such as transfer switch 228B. Accordingly, the remote power panel 108 may include 42 breaker positions to distribute power from the primary power source and may additionally include 42 breaker positions to distribute power from the secondary power source. The configuration and power distribution scheme is not to be limited by the description herein; rather multiple configurations and distribution schemes are contemplated.

In addition, to provide instantaneous and real-time monitoring of each branch circuit, or circuit, created by one or more breakers, the remote power panel 108 includes current transformers 332, signal wiring 334, and a data acquisition module 340. The current transformer 332 may be any sensor capable of providing a signal indicative of an amount of current flowing through a circuit. That is, a current transformer is used for measurement of alternating electric currents. When current in a circuit is too high to apply directly to measuring instruments, a current transformer produces a reduced current accurately proportional to the current in the circuit, which can be conveniently connected to measuring and recording instruments. A current transformer isolates the measuring instruments from what may be very high voltage in the monitored circuit. Split-core current transformers provide linear output voltage that is directly proportional to the input current. These current transformers are safely and easily installed over existing electrical power lines and/or on existing panel boards. For example, a current transformer may be placed in or around terminal wiring associated with a breaker in breaker position 42. Thus, the current transformer may provide a signal indicative of the amount of current flowing through the breaker in the breaker position 42 to the data acquisition module 340 via the signal line 334. The data acquisition module 340 may include the necessary hardware, as described below, to acquire the signal indicative of the amount of current flowing through a branch circuit, convert the signal into an analog signal, digital signal, and/or value representative of the amount of current flowing through a branch circuit, and relay such a signal to a data center infrastructure manager for collection and analysis.

It is important to note that in some embodiments, a single current transformer may be associated with a single breaker position; therefore, since a current transformer measures the instantaneous or real-time current flow according to the breaker position, in instances where the branch circuit includes multiple breaker positions as described above, such as a branch circuit capable of providing 208 volts AC, two breaker positions, and thus two current transformers may be utilized. Therefore, two signals indicative of the instantaneous or real-time current flowing through the branch circuit may be provided to the data acquisition module 340, one signal indicative of the current flowing through a first breaker position, such as breaker position 26, and one signal indicative of the current flowing through a second breaker position, such as breaker position 28. For example, if a 208 volt AC 30 amp 2 pole breaker 304B occupied breaker positions 40 and 42 of the remote power panel 108, a first current transformer located next to breaker position 40 would provide a signal indicative of an instantaneous or real-time amount of current flowing through B phase. Similarly, a second current transformer located next to breaker position 42 would provide a signal indicative of an instantaneous or real-time amount of current flowing through a C phase. Therefore, when calculating true and/or apparent power, the duplicate measurement of current flowing through the circuit must be taken into account. In some embodiments, and as described later, the signals indicative of the current flowing through each breaker position may be further processed in order to provide true and/or apparent power consistent with the circuit type.

Figure 4:
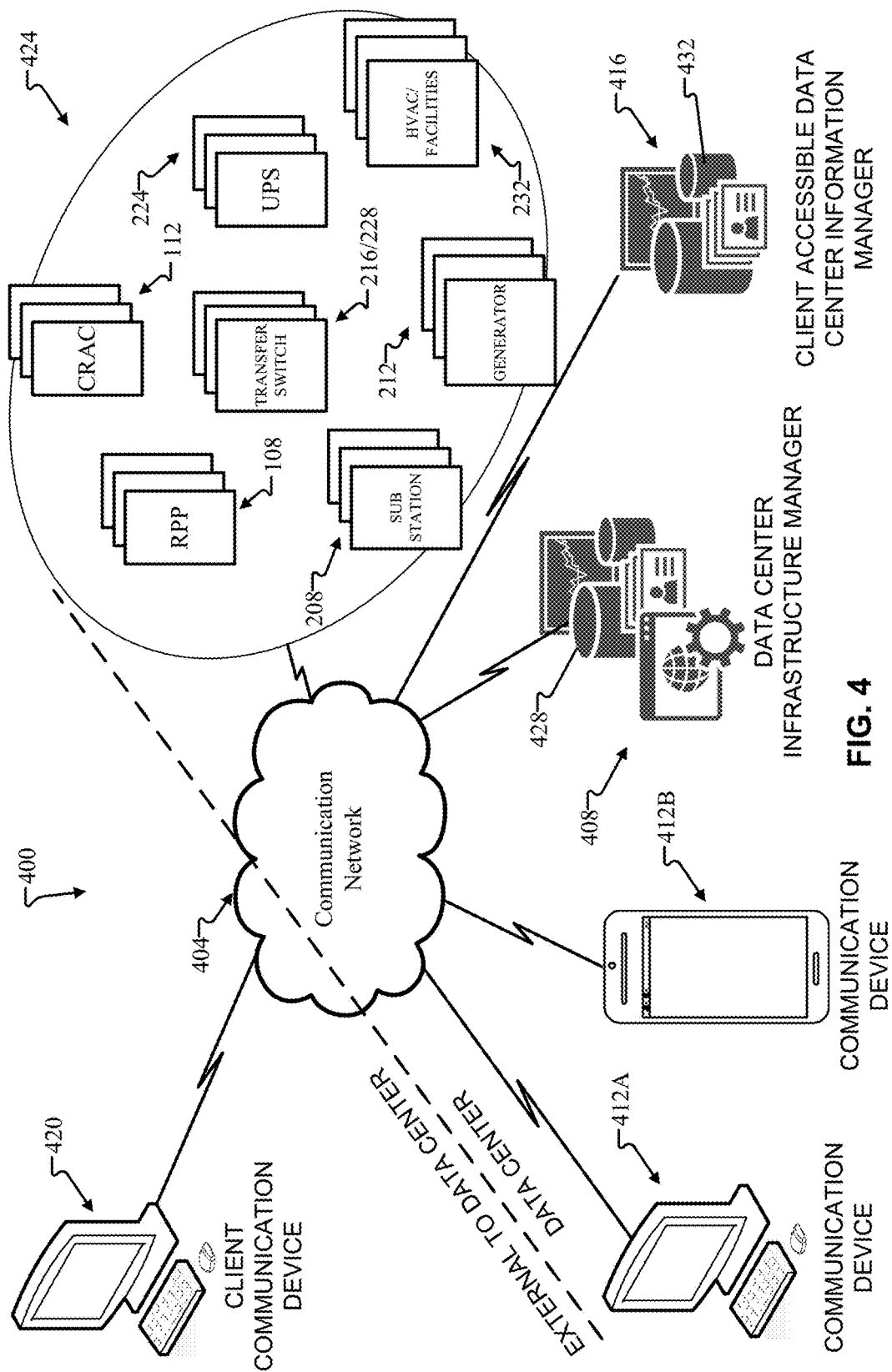
FIG. 4 shows an example of a communication system for enabling communication between a data center infrastructure manager, one or more elements of a data center, and/or a client communication device.

FIG. 4 shows an example of a communication system 400 for enabling communication between a data center infrastructure manager, one or more elements of a data center, and/or a client communication device in accordance with embodiments of the present disclosure. As provided in FIG. 4, a data center communication system may include a data center infrastructure manager 408, one or more communication devices 412, a communication network 404, a client communication device 420, a client accessible data center information manager 416, and/or one or more components illustrated in FIG. 2 capable of providing information to the data center infrastructure manager 408. For example, the remote power panel 108, the CRAC units 112, the substation 208, the generator 212, the UPS units 224, and/or other HVAC/facilities 232 associated with a data center may be capable of providing information about each respective device to the data center infrastructure manager. As one example, the remote power panel 108 may provide, via the data acquisition module 340, a status of each breaker and/or breaker positions. Similarly, the data acquisition module 340 may determine the instantaneous or real-time current flowing through each breaker associated with a current transformer at each breaker position and provide such information to the data center infrastructure manager 408. In addition, the CRAC units 112 may provide a status—whether it is on/off, a temperature of air exiting such CRAC unit 112, and/or a humidity associated with the air exiting such CRAC unit 112 to the data center infrastructure manager 408. Moreover, the transfer switch 216/228 may provide information relating to which source of power, primary or secondary, is being utilized, a current associated with each feed provided to a respective remote power panel 108, an overall status, and/or information related to the power provided from the UPS units 224 and/or the power provided to the remote power panel 108.

The communication network 404 may comprise any type of known communication medium or collection of communication media and may use many types of protocols to transport messages between endpoints, such as communication device 112, data center infrastructure manage 408, client accessible data center information 416, client communication device 420, and/or one or more of the data center and power distribution elements 424 as depicted individually in FIG. 2. The communication network 404 may include wired and/or wireless communication technologies. The Internet is an example of the communication network 404 that constitutes an Internet Protocol (IP) network consisting of many computers, computing networks, and other communication devices located all over the world, which are connected through many networked systems and other means. Other examples of the communication network 404 include, without limitation, a standard Plain Old Telephone System (POTS), an Integrated Services Digital Network (ISDN), the Public Switched Telephone Network (PSTN), a Local Area Network (LAN), a Wide Area Network (WAN), a cellular network, and any other type of packet-switched or circuit-switched network known in the art, an intranet; an extranet; an infra-red network; a wireless network (e.g., a network operating under any of the IEEE 802.11 suite of protocols, the Bluetooth™ protocol known in the art, and/or any other wireless protocol). In addition, it can be appreciated that the communication network 404 need not be limited to any one network type, and instead may be comprised of a number of different networks and/or network types. Further, in instances where one or more of the data center and power distribution elements 424 rely on a standardized and/or proprietary communication medium to communicate information to the data center infrastructure manager, such communication network 404 is capable of or otherwise includes such communication ability. For example, ModBus, infrared, serial communications, including RS 232 and RS 422, and 4-20 mA loops may be relied upon to communicate information and communication network 404 may include such communication capability.

Plural local or communication devices 412, 420 may be connected via the communication network 404 to the data center infrastructure manager 408 and/or other endpoints as previously discussed. The communication devices 412, 420 may each be variously a personal computer, a server of any type, a PDA, mobile phone, an interactive television, or any other device capable of loading and operating computer objects. The client communication device 420 may also be considered a remote communication device, such a remote client communication device 420 may allow a client access to the client accessible data center information manager 416 such that the client is able to view details about their configuration and/or setup within the data center facility. As illustrated in FIG. 4, the client communication device 420 may reside outside of or external to the data center. Although the communication device 412 is illustrated as being within the data center, it is contemplated that a communication device 412 may be able to access data center information regardless of whether or not such device resides on a local data center network.

In addition, FIG. 4 depicts the data center infrastructure manager 408. The data center infrastructure manager 408 may include the ability to receive data from each of the data center and power distribution elements 424. The data center infrastructure manger 408 may also include one or more server communication devices, such as a web server, which may be used to process requests for web pages or other electronic documents from communication device 412, and/or the data center power distribution elements 424. The web server can be running an operating system including any of those discussed above, as well as any commercially-available server operating systems. The data infrastructure manager 408 may also run a variety of server applications, including HTTP servers, FTP servers, CGI servers, database servers, Java servers, and the like. In some instances, the data center infrastructure manager 408 may publish operations available as one or more web services. The database 428 associated with the data center infrastructure manager 408 may reside in a variety of locations. By way of example, database 428 may reside on a storage medium local to (and/or resident in) one or more of the servers on which the data center infrastructure manager 408 is running. Alternatively, the database 428 may be remote from any or all of the computers or controllers, and in communication (e.g., via the network 404) with one or all of the computers and controllers. The database 428 may reside in a storage-area network ("SAN") familiar to those skilled in the art. The database 428 may be a relational database, such as Oracle 12c™, that is adapted to store, update, and retrieve data in response to SQL-formatted commands.

Further, the data center infrastructure manager 408 may provide the ability to interact with the data center and power distribution elements 424. For example, the data center infrastructure manager 408 may change one or more settings on a remote power panel 108, a UPS unit 224, and/or control the operation of one or more of the CRAC units 212. Further, the data center infrastructure manager 408 may provide the ability to track circuit breakers, circuit breaker position usage, client assignments to breaker positions of remote power panels 108, remote power panel 108 utilization, UPS unit 224 utilization, and power allocation among clients, remote power panels 108, UPS units 224, and/or transfer switches 216/228.

The communication system 400 may also include the client accessible data center information manager 416. Similar to the data center infrastructure manager 408, the client accessible data center information manager 416 may also include one or more server communication devices, such as a web server, which may be used to process requests for web pages or other electronic documents from communication device 420 and/or the data center infrastructure manager 408. That is, the client accessible data center information manager 416 web server can be running an operating system including any of those discussed above, as well as any commercially-available server operating systems. The client accessible data center information manager 416 may also run a variety of server applications, including HTTP servers, FTP servers, CGI servers, database servers, Java servers, and the like. In some instances, the client accessible data center information manager 416 may publish operations available as one or more web services. The database 432 associated with the client accessible data center information manager 416 may reside in a variety of locations. By way of example, database 432 may reside on a storage medium local to (and/or resident in) one or more of the servers on which the client accessible data center information manager 416 is running. Alternatively, the database 432 may be remote from any or all of the computers or controllers, and in communication (e.g., via the network 404) with one or all of the computers and controllers. The database 432 may reside in a storage-area network ("SAN") familiar to those skilled in the art. The database 432 may be a relational database, such as Oracle 12c™, that is adapted to store, update, and retrieve data in response to SQL-formatted commands. Alternatively, or in addition, the database 432 may also be the same as database 428. That is the client accessible data center information manager 416 may have access to the database 428 of the data center infrastructure manager 408.

The client accessible data center information manager 416 generally provides a client communication device 420 with access to the client specific data managed by data center infrastructure manager 408. That is, the client communication device 420 may only have access to the data provided by the client accessible data center information manager 416. By way of example only, the client accessible data center information manager 416 may be utilized to enhance a security model and/or access associated with the data center and the data center operation. For example, since many of the data center and power distribution elements 424 are critical to the overall operation of the data center, a rogue client with access to the data center infrastructure manager 408 could jeopardize the operation of the data center. Accordingly, appropriate access controls may be implemented such that clients utilizing a client communication device 420 are able to view only information that the client has access to and minimize any risk associated with open access to the data center infrastructure manager 408. Accordingly, the client accessible data center information manager 416 may act as a proxy or function as a proxy-like entity and may simply request data from the data center infrastructure manager 408 to provide such data to the client communication device 420.

Figure 5:
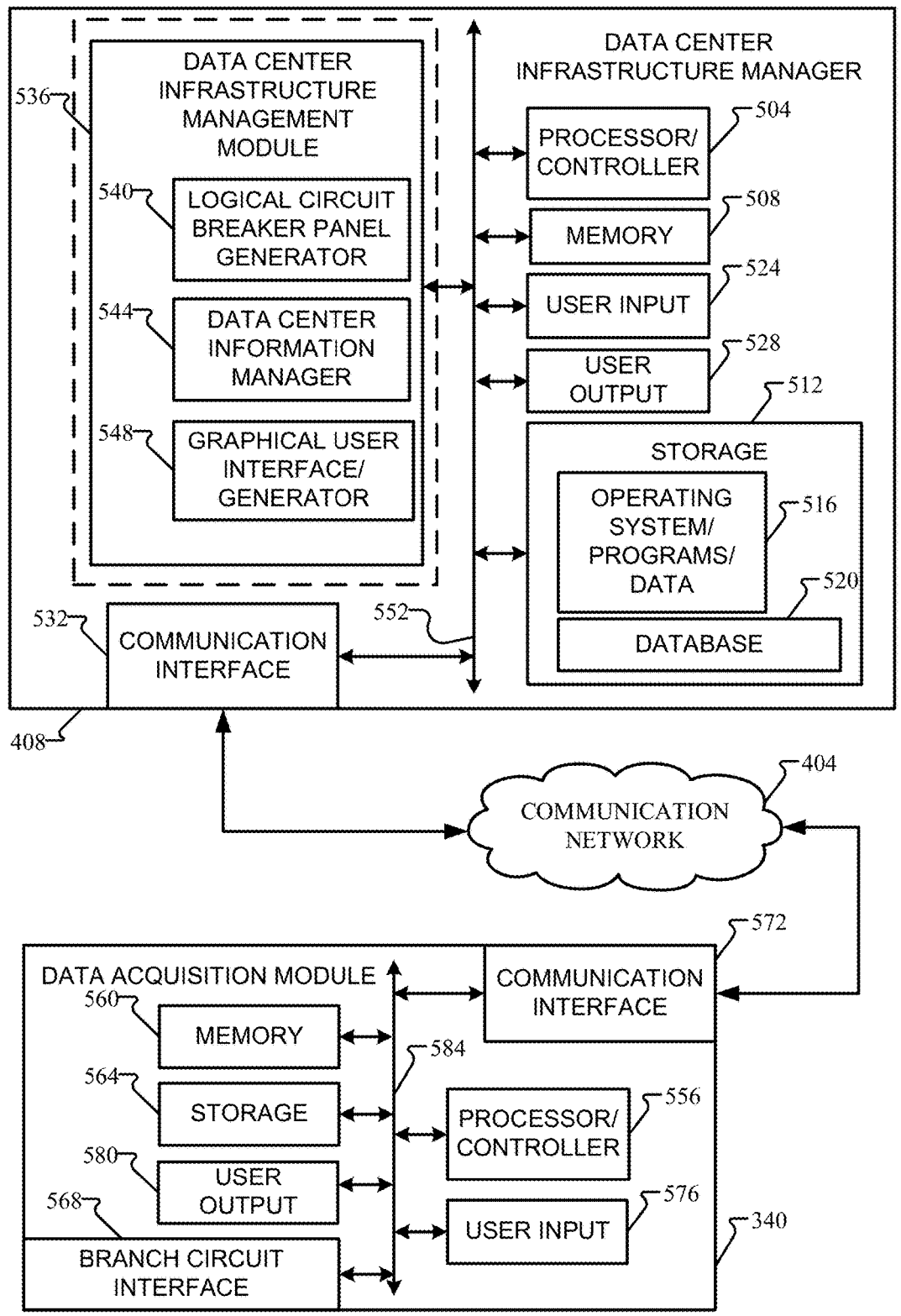
FIG. 5 depicts additional details with respect to an example data center infrastructure manager and a data acquisition module.

FIG. 5 depicts additional details with respect to a data center infrastructure manager and a data acquisition module in accordance with embodiments of the present disclosure. More particularly, the data center infrastructure manager 408 may generally include a processor 504, memory 508, storage 516, a database 520, a communication interface 532, and a data center infrastructure management module 536, user input 524, and user output 528. Processor 504 is provided to execute instructions contained within memory 508. Accordingly, the processor 504 may be implemented as any suitable type of microprocessor or similar type of processing chip, such as any general-purpose programmable processor, digital signal processor (DSP) or controller for executing application programming contained within memory 508. Alternatively, or in addition, the processor 504 and memory 508 may be replaced or augmented with an application specific integrated circuit (ASIC), a programmable logic device (PLD), or a field programmable gate array (FPGA).

The memory 508 generally comprises software routines facilitating, in operation, predetermined functionality of the data center infrastructure manager 408. The memory 508 may be implemented using various types of electronic memory generally including at least one array of non-volatile memory cells (e.g., Erasable Programmable Read Only Memory (EPROM) cells or FLASH memory cells, etc.) The memory 508 may also include at least one array of dynamic random access memory (DRAM) cells. The content of the DRAM cells may be pre-programmed and write-protected thereafter, whereas other portions of the memory may selectively be modified or erased. The memory 508 may be used for either permanent data storage or temporary data storage. Alternatively, or in addition, data storage 512 may be provided. The data storage 512 may generally include storage for programs and data. For instance, with respect to the data center infrastructure manager 408, data storage 512 may provide storage for the data center infrastructure management module 536 and a database 520. Database 520 may be the same as or similar to the database 428 previously discussed. Data storage 512 associated with the data center infrastructure manager 408 may also provide storage for one or more user data center infrastructure management applications and/or operating system software. The communication interface 532 may allow the data center infrastructure manager 408 to communicate over a communication medium to the communication network 404.

The data center infrastructure management module 536 may provide and/or perform one or more functions associated with the management of data center information. For example, and as previously discussed, the data center infrastructure manager 408 may receive status information, operating information, and client information from each of the data center and power distribution elements 424. From this received information, and as will be discussed, the data center infrastructure management module 536 may rely on the data center information manager 544 to organize and track such information. More particularly, the data center information manager 544 may track and record client specific information, such as how much power, in watts and kVA, has been allocated to a specific client, which breaker positions and which remote power panels 108 have been assigned to the client, and further what UPS units 224A-C feed the respective remote power panel 108. Such information may further be pulled from and/or provided from the logical circuit breaker panel generator 540, which is configured to generate a logical circuit breaker panel, for each remote power panel 108, based on the physical breaker positions within the remote power panels 108, the instantaneous or real-time measured current for each breaker position, the circuit type, client allocated power, circuit voltage, and any circuit warnings. The data center infrastructure management module 536 may further rely on the graphical user interface/generator 548 to generate a graphical user interface based on such information. The data center infrastructure manager 408 may further include one or more user input devices 524, such as a keyboard and a pointing device, and one or more output devices 528, such as a display and a speaker. The user interface/generator 548 may display a user interface at a user output 528. A user input 524 and user output 528 device can comprise a combined device, such as a touch screen display. Communications between various components of the data center infrastructure manager 408 may be carried by one or more buses 552.

FIG. 5 depicts additional details of the data acquisition module 340 in accordance with some embodiments of the present disclosure. The data acquisition module 340 may generally include a processor/controller 556, memory 560, storage 564, a branch circuit interface 568, a communication interface 572, user input 576, and user output 580. Similar to the processor of the data center infrastructure manager 408, the processor/controller 556 is provided to execute instructions contained within memory 560. Accordingly, the processor 556 may be implemented as any suitable type of microprocessor or similar type of processing chip, such as any general-purpose programmable processor, digital signal processor (DSP) or controller for executing application programming contained within memory 560. Alternatively, or in addition, the processor 556 and memory 560 may be replaced or augmented with an application specific integrated circuit (ASIC), a programmable logic device (PLD), or a field programmable gate array (FPGA).

The memory 560 generally comprises software routines facilitating, in operation, predetermined functionality of the data acquisition module 340. The memory 560, similar to the memory 508, may be implemented using various types of electronic memory generally including at least one array of non-volatile memory cells (e.g., Erasable Programmable Read Only Memory (EPROM) cells or FLASH memory cells, etc.) The memory 560 may also include at least one array of dynamic random access memory (DRAM) cells. The content of the DRAM cells may be pre-programmed and write-protected thereafter, whereas other portions of the memory may selectively be modified or erased. The memory 560 may be used for either permanent data storage or temporary data storage. Alternatively, or in addition, data storage 564 may be provided. The data storage 564 may generally include storage for programs and data. For instance, and with respect to the data acquisition module 340, data storage 564 may provide storage for the data acquisition module 340 to store the analog, digital, and/or other values indicative of a current flowing at a breaker position as previously discussed. That is, the current transformer 332 may provide a signal indicative of a current flowing at a breaker position 308 of a remote power panel 108. Such a signal may be transmitted through the current transformer wiring 336 to the branch circuit interface 568 of the data acquisition module 340. The branch circuit interface 568 may be directly connected to the current transformer wiring 336 such that the signal indicative of current flowing at a breaker position is received at the branch circuit interface 568. The branch circuit interface 568 may then convert the received signal, with the assistance of the processor/controller 556 and/or memory 560, for each of the breaker positions, and store the converted values in the storage 564, for instance. Accordingly, a request from the data center infrastructure manager 408 via the communication interface 572 may retrieve the values; such values may be stored in the database 428. The data acquisition module 340 may further include one or more user input devices 576, such as a keyboard and/or touchpad, and one or more output devices 580, such as a display. A user input 524 and user output 528 device can comprise a combined device, such as a touch screen display. Communications between various components of the data acquisition module 340 may be carried by one or more buses 584.

Figure 6:
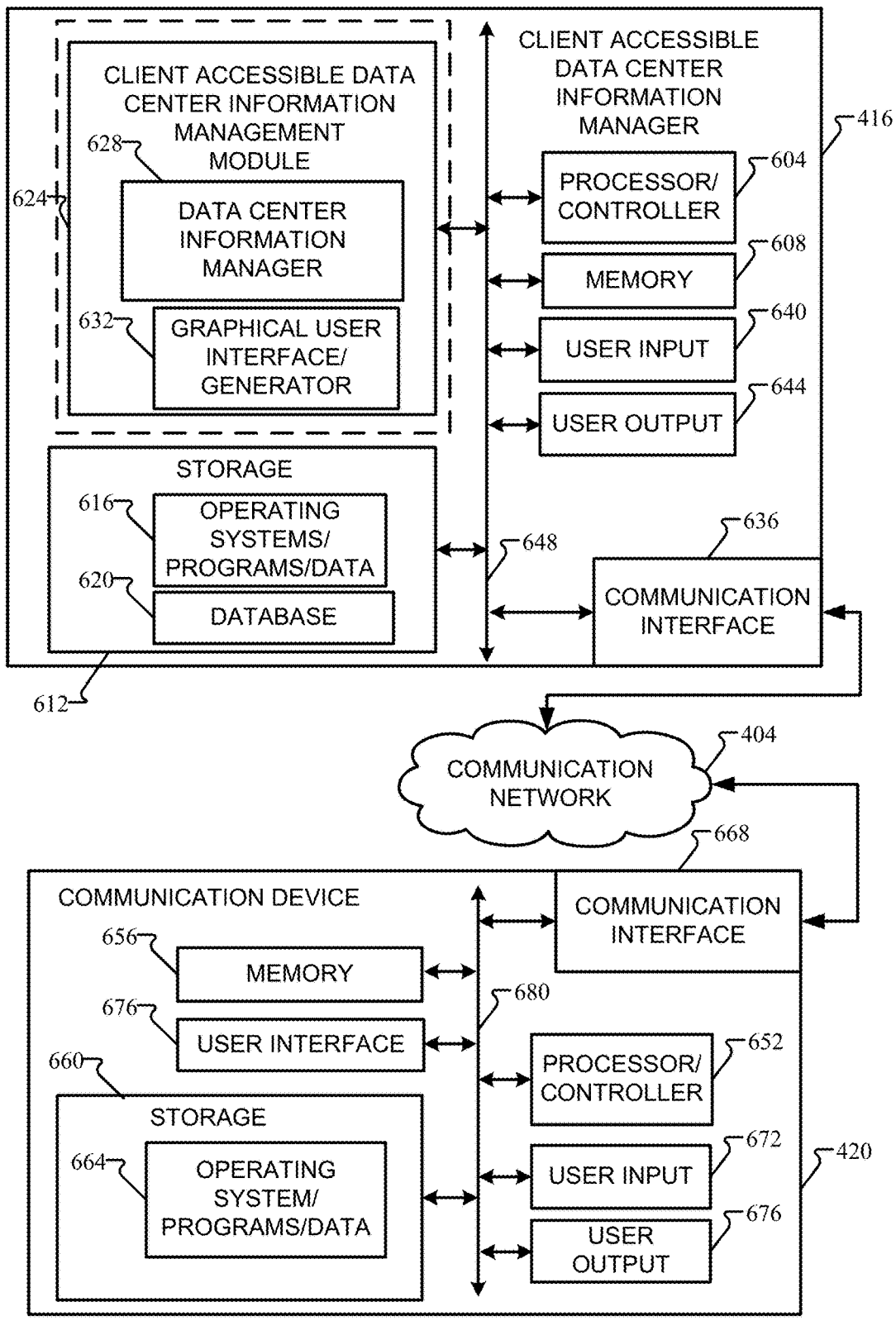
FIG. 6 depicts additional details with respect to an example client accessible data center information manager.

Referring now to FIG. 6, additional details with respect to a client accessible data center information manager 416 and a client communication device 420 are provided in accordance with embodiments of the present disclosure. The processor/controller 604, the memory 608, the communication interface 636, the user input 640, the user output 644, bus 648, storage 612, operating system/programs/data 616, and database 620 may be the same or similar to the processor/controller 504, the memory 508, the communication interface 532, the user input 524, the user output 528, bus 552, storage 512, operating system/programs/data 516, and database 520 described with respect to the data center infrastructure manager 408. Accordingly, the description thereof has been omitted. The client accessible data center information management module 624 may provide and/or perform one or more functions associated with providing a user, such as a client, that is external to a data center, information pertaining to the power usage associated with one or more circuits in one or more client cabinets/racks 104. For example, and as previously discussed, the data center infrastructure manager 408 may receive status information, operating information, and client information from each of the data center and power distribution elements 424. From this received information, the data center infrastructure management module 536 may rely on the data center information manager 544 to organize and track such information. More particularly, the data center information manager 544 may track and record client specific information, such as how much power, in watts and kVA, has been allocated to a specific client, which breaker positions and which remote power panels 108 have been assigned to the client, and further what UPS units 224A-C feed the respective remote power panel 108. Such information may further be pulled from and/or provided from the logical circuit breaker panel generator 540, which is configured to generate a logical circuit breaker panel, for each remote power panel 108, based on the physical breaker positions within the remote power panels 108, the instantaneous or real-time measured current for each breaker position, the circuit type, client allocated power, circuit voltage, and any circuit warnings. Such information may be stored or otherwise saved to a database, such as database 428, 520. The database 620 of the client accessible data center information manager 416 may then be provided with such data from the data center infrastructure manager 408. Accordingly, the data center information manager 628 may be responsible for verifying and authenticating client requests, such as client requests to view client specific information. Further, since the client accessible data center information management module 624 may have access to data for all clients, the data center information manager 628 may be required to filter such client information based on a unique client identifier, such as a client name and/or number.

The data center infrastructure management module 536 may further rely on the graphical user interface/generator 548 to generate a graphical user interface based on such information. The data center infrastructure manager 408 may further include one or more user input devices 524, such as a keyboard and a pointing device, and one or more output devices 528, such as a display and a speaker. The user interface/generator 548 may display a user interface at a user output 528. A user input 524 and user output 528 device can comprise a combined device, such as a touch screen display. Communications between various components of the data center infrastructure manager 408 may be carried by one or more buses 552.

Referring now to FIG. 7, a method 700 of determining a rack/cabinet 104, allocating power, and assigning breaker positions to a client will be discussed in accordance with embodiments of the present disclosure. Method 700 is in embodiments, performed partially or wholly by a device, such as the data center infrastructure manager 408. More specifically, one or more hardware and software components may be involved in performing method 700. In one embodiment, one or more of the previously described modules and/or devices perform one or more of the steps of method 700. The method 700 may be executed as a set of computer-executable instructions executed by a computer system or the data center infrastructure manager 408 and encoded or stored on a computer-readable medium. Hereinafter, the method 700 shall be explained with reference to systems, components, modules, software, etc. described with FIGS. 1-6.

Method 700 may continuously flow in a loop, flow according to a timed event, or flow according to a change in an operating or status parameter. Method 700 is generally initiated at step S704, where user input 524 may be received at the data center infrastructure manager 408 and/or a computing device in communication with the data center infrastructure manager 408. For example, a user, or data center operator, may wish to add a new client to a colocation data center. In order to add the new client, the power requirements of the client must be assessed in order to determine which data center room 100 the client should be assigned to, which cabinet/rack 104 in the data room 100 that the client should be assigned to, which UPS unit 224, static transfer switch 228, and which remote power panel 108 the client should be assigned to. For example, a new client may wish to install a server in a new cabinet/rack 104; after assessing the server, it is determined that the manufacturer recommends using redundant power sources to power two 650 watt power supplies. Accordingly, the new client's power requirement may be 1300 watts, of which 650 watts may be sourced from the A side 320 and 650 watts may be sourced from the B side 324; such power requirement is then received at step S708. After assessing the available cabinet/rack 104 space, the data center operator assigns the client to a cabinet/rack 104 in a particular data center room 100, at step S712. The data center operator may then consult/review one or more logical circuit breaker panels, such as the logical circuit breaker panel of FIG. 10, to determine whether the UPS unit 224 has unallocated power meeting the needs of the client, whether the transfer switch 228 has unallocated power meeting the needs of the client, and finally whether the remote power panel 108 of which the data center operator is viewing has unallocated breaker positions available that meet the needs of the client. Once the data center operator identifies an open breaker position or positions in the remote power panel 108, the data center operator may assign the breaker positions in the remote power panel 108 to the previously identified cabinet/rack 104 and/or the client and allocate the client's power requirements to the assigned breaker position in step S712. Such assignments may be made at the data center information manager 544 of the data center infrastructure manager 408. In some embodiments, due to the logical linking between the UPS units 224, the transfer switch 228, and the remote power panel 108, this may be the only assignment necessary to facilitate proper power distribution. In other embodiments, the data center operator may need to assign the client to remote power panel 108 in steps S716, and assign the breaker positions to the client in step S720. The method 700 then ends at step S724. Accordingly, a data structure 728 may be generated by method 700. The data structure 728 generally includes information about the client, such as the client's name, how much power has been allocated to the client, a globally unique identifier (guid) of the remote power panel the client has been assigned to, and an identification of the breaker positions within the remote power panel that are assigned to the client. For example, the data structure 728 may include, but is not limited to, client information 732, allocated power 736, remote power panel guid 740, and one or more breaker positions 744A-C. In instances where a client has been assigned to multiple cabinets/racks 104, multiple remote power panels 108, and/or multiple breaker positions within each remote power panel 108, the data structure 728 may be expanded to include such information.

Figure 8:
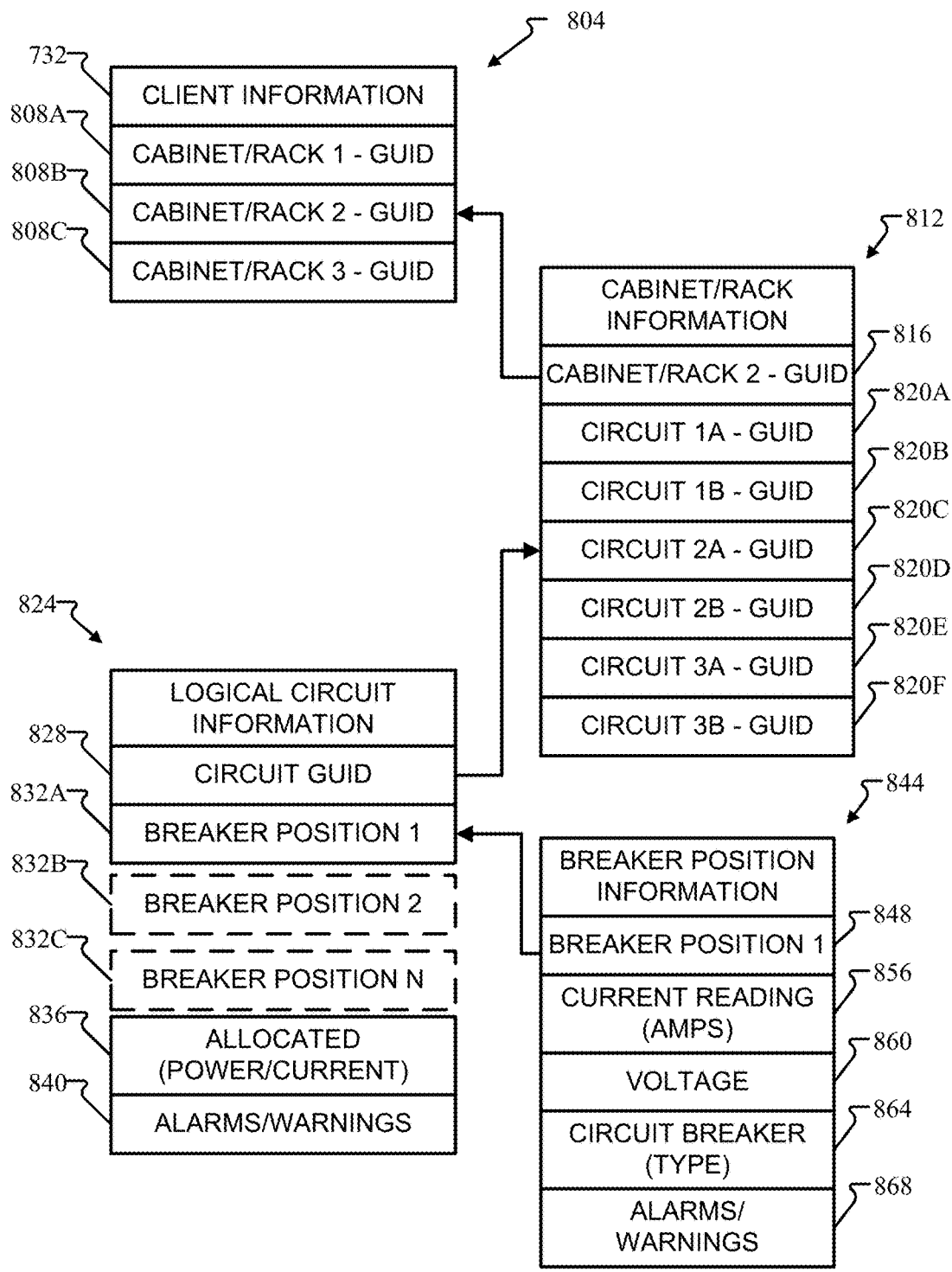
FIG. 8 illustrates one or more data structures having one or more data fields in accordance with the invention.

FIG. 8 illustrates one or more data structures having one or more fields and an association between each of the data fields in accordance with some embodiments of the present disclosure. As illustrated in FIG. 8, one or more relational data structures including linking information are shown. Data structure 804 may additionally include information identifying which cabinet/racks 808A-808C have been assigned to the client. Based on the cabinet/rack 104 assignment, a cabinet/rack information data structure 812 may track information associated with each cabinet/rack 104. For example, data structure 812 may include identification information about which circuits have been assigned to the specific cabinet/rack 104. For example, as illustrated in FIG. 8, the cabinet/rack 104 having a specific guid in the cabinet/rack guid field 816 includes six circuits total, of which half are redundant circuits (e.g. A side and B side). Each of the circuits 820A-F may be uniquely identified with a guid. Alternatively, or in addition, each of the circuits 820A-F may be uniquely identified based on their association with a cabinet/rack 808A-C, and the one or more breaker position (s) making up the respective circuit. That is, each of the circuits 820A-F may be identified based on a relational association with one or more breaker positions (s). It is important to note that each of the circuits 820A-F are logical, or virtual, circuits in that they may require one or more breaker positions 308 on an associated remote power panel 108. Accordingly, the logical, or virtual, circuit information data structure 824 may provide additional details about each of the logical circuits 820A-F. For example, the logical circuit guid 824 may indicate that the logical circuit having guid 828 includes one or more breaker positions 832A-C. Further, the logical circuit having guid 828 may include an amount of power allocated 836 for such circuit and any alarm and/or warning 840 thresholds existing for the logical circuit. As one example, a logical circuit for a particular client may be allocated 600 watts. Such logical circuit allocation may further affect the alarms/warnings 840.

Additionally, the breaker position information data structure 844 may include information indicating whether the breaker position information data structure 844 may include information indicating an amount of current in amps 856, as measured by a current transformer 332, that is flowing through the breaker; the breaker position information data structure 844 may include information indicating the breaker position voltage 860; the breaker position information data structure 844 may include information 864 indicating a type of the breaker (e.g., 15 A, 20 A, 30 A breaker); and the breaker position information data structure 844 may include information 868 indicating whether any alarms or warnings have been configured for current and/or power usage for the logical circuit, what the alarms and warnings area (i.e. what thresholds have been defined), and whether any of the thresholds have been exceeded. Further, the alarms/warnings 868 may be configured to comply with a National Electric Code (NEC) 80% circuit loading requirement. That is, an NEC rated circuit, during usage and in compliance with the NEC rating, should not exceed 80% of the rate capacity; accordingly, a 20 amp rated NEC circuit should not exceed 16 amps. Such information may then be utilized to generate a logical circuit breaker panel for a specific remote power panel 108 as illustrated in FIG. 9.

Figure 9:
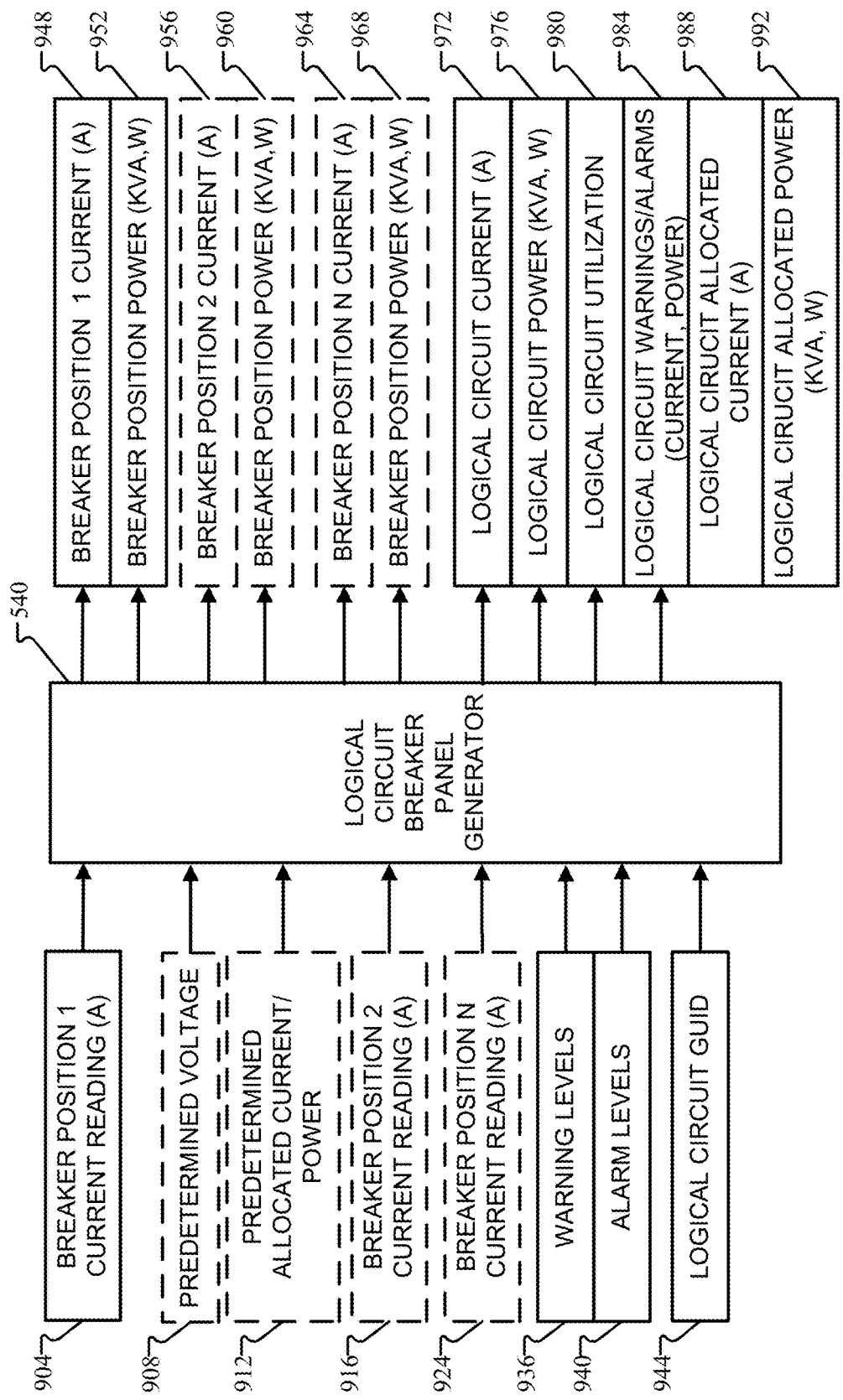
FIG. 9 illustrates inputs and outputs of an example logical circuit breaker panel generator in accordance with the invention.

FIG. 9 illustrates inputs and outputs of an example logical circuit breaker panel generator 540 in accordance with some embodiments of the present disclosure. The logical circuit breaker panel generator 540 generates a logical circuit breaker panel based on the individual breaker positions, logical circuit information, and additional information that is specific to each breaker position and each logical circuit. Accordingly, each physical circuit supplying power to a client may be represented as a logical circuit such that an overall current, power, and logical circuit utilization may be generated in instances where a physical circuit utilizes more than one breaker position. To generate logical circuit utilization readings, such as how much current and power the logical circuit is utilizing, the logical circuit breaker panel generator 540 may be fed information from one or more of the previously described data structures. For example, the logical circuit breaker panel generator 540 may be fed or otherwise obtain (i) an instantaneous or real-time current reading from a specific or assigned breaker position 904, (ii) alarm levels 940 associated with the logical circuit, and lastly (iii) a logical circuit guid 944 to use when creating the logical circuit. Further, in instances where the logical circuit relies on two or more breaker positions, such as when 208V service is supplied to a client, the corresponding instantaneous or real-time current reading from the other assigned breaker positions 916/924 may be received. The voltage 908 for the circuit and an allocated current/power 912 for the circuit may be provided by voltage 860 and allocated power 736 respectively. The voltage 908 and allocated current/power 912 may be a predetermined voltage and may be provided as a manual input or selection into the logical circuit breaker panel generator 540.

The logical circuit breaker panel generator 540 may then generate a logical, or virtual, circuit identified utilizing the logical circuit guid 944 and based on the parameters 904-944 as previously described. For example, based on the parameters 904-944 as previously described, the logical circuit breaker panel generator may generate a logical circuit having guid 944, values for current utilization 948 associated with a first breaker position, and values for power utilization 952 associated with the first breaker position. Further, in instances where the logical circuit relies on two or more breaker positions, such as when 208V service is supplied to a client, the corresponding current and power utilization from the other assigned breaker positions, such as breaker position 2 and breaker position 3 may be generated. For instance, values for current utilization 956 for breaker position 2, power utilization 960 for breaker position 2, current titillation for breaker position N and power utilization for breaker position N may be generated.

Further, a logical circuit having guid 944 may also generate circuit values associated with an overall logical circuit current 972 based on the breaker position current utilizations 948, 956, and 964. For example, a logical circuit having as inputs a single instantaneous or real-time current reading 904, may generate a current utilization value 948 associated with the single breaker position. Similarly, the logical circuit having as inputs a single instantaneous or real-time current reading 904, may generate a power utilization 976 value associated with the single breaker position. Further, based on the logical circuit power utilization 976 values and an allocated power 912 value, a logical circuit percentage utilization 980 value may be generated. For instance, if a client has been allocated 960 watts but is using 300 watts, the logical circuit utilization 980 value may be 31.3%. Similarly, values for alarm warnings and alarm levels 984 based on the logical circuit current utilization 972 value, the logical circuit power utilization 976 value, warning levels 936, and alarm levels 940 may be generated.

In instances where the logical circuit relies on two or more breaker positions, such as when 208V service is supplied to a client, the corresponding current and power utilization values from the other assigned breaker positions, such as breaker position 2 and breaker position 3 may be used to calculate the logical circuit current utilization 972 value, the logical circuit power utilization 976 value, the percent logical circuit utilization value 980. For example, in a 208V circuit, the logical circuit current utilization value 972 is based on the current utilization 948 for breaker position 1 and the current utilization 956 for breaker position 2. That is, the logical circuit current utilization value 972 is an aggregate of the current utilization 948 for breaker position 1 and the current utilization 956 for breaker position 2. Accordingly, the current utilization 948 for breaker position 1 and the current utilization 956 for breaker position 2 may be averaged to arrive at the logical circuit current utilization 972. Similarly, the logical circuit power utilization 976 will be based on the logical circuit current utilization 972 and the circuit voltage 908. Alternatively, or in addition, the logical circuit power utilization 976 will be based on an aggregate, or average, of the power utilization value 952 for breaker position 1 and the power utilization value 960 for breaker position 2. Similarly, the logical circuit current utilization 972 would be based on an aggregate, or average, of the current utilization 948 for breaker position 1, the current utilization 956 for breaker position 2, and the current utilization 964 for breaker position N, where N is equal to 3. The percent logical circuit utilization value 980 may be based on the allocated current for the logical circuit 988 and/or the allocated power for the logical circuit 992; each of which may be derived or based on allocated current/power input 912.

FIG. 10 illustrates a logical circuit breaker panel 1000 for an RPP in accordance with embodiments of the present disclosure. The logical circuit breaker panel 1000 may include information generated from the logical circuit breaker panel generator 540 as described with reference to at least FIG. 9. A logical circuit breaker panel 1000 may correspond or otherwise be associated with each of the RPPs 108 and may additionally include additional tracking information, such as the real-time, or instantaneous, use and allocation of power, provided from the data center information manager 544. Further, the graphical user interface/generator 548 may generate the display as illustrated in FIG. 10 and further provide the display to one or more user output devices 528, such as a monitor or other display device.

In accordance with embodiments of the present disclosure, the logical circuit breaker panel 1000 may be used to assist with capacity planning and identification of open breaker position or subsequent assignment to a client. The logical circuit breaker panel 1000 includes remote power panel guid identification information 1004. For example, the remote power panel guid identification information 1004 may identify a specific RPP 108 and/or whether the displayed logical circuit breaker panel 1000 is for an A side, B side, or both. The logical circuit breaker panel 1000 also includes information provided from the logical circuit breaker panel generator 540 as previously described with respect to FIG. 9 and additional information from one or more previously described data structures. As illustrated, the logical circuit breaker panel 1000 may display information associated with each logical circuit, as a function of breaker position, and include an identification of the breaker position (BKR) corresponding to a breaker position 848 for each logical circuit. Similarly, the logical circuit breaker panel 1000 may include cabinet/rack guid information 808 and a client name provided by client information 732. The cabinet/rack may also include an identification of which breaker positions are included in a logical circuit. For instance, the breaker position 37 is utilized to provide 208V power to a specific cabinet/rack. Because 208V requires two circuit breaker positions, as previously discussed, the cab/rack information may display 37/39, for example. In addition, the logical circuit breaker panel 1000 may include information indicating the type 864 of the logical circuit breaker and whether the circuit is redundant (R) or not together with a rated amperage of breaker position. The logical circuit breaker panel 1000 may also include a real-time, or instantaneous, display of the power utilization 976 (P(W)), a power allocation (AL(W))—provided from 836, a percentage of power used 980 (% USED) as a function of the amount of power allocated, and further the real-time, or instantaneous current utilization 972 in amps. Moreover, the logical circuit breaker panel 1000 may also provide information relating to whether any warnings (WRN) or alarms (ALM) 984 have been exceeded. Further, the logical circuit breaker panel 1000 may provide an indication as to which phase (Ph) the breaker position has been associated.

The logical circuit breaker panel 1000 may also include summarization information related to power available 1012, power use information 1016, and power source information 1020. The panel power available 1012 section provides summary information directed to the power capacity of the RPP, use, and availability of power. For example, the panel power available 1012 section may provide the power, in KVA, allowed at the RPP, the total power, in KVA, being used by the RPP, how much power, in KVA, has been allocated, and how much power, in KVA, is available based on the amount allocated and the amount being currently used. Such information may be obtained by summing the power allocation (AL(W) for all logical circuit, summing the instantaneous, or real-time, power utilization (P(W)) for all logical circuits, and/or subtracting such values form the allowed power (KVA). Accordingly, a colocation data center operator may be able to quickly determine, not only if there is physical space within the RPP for a new or existing client, but also whether the RPP can support an additional power requirement based on an allocated amount of power and an actual usage amount of power.

The logical circuit breaker panel 1000 may also include a power source information section 1020. The power source information section 1020 generally includes information identifying the UPS 224 and the transfer switch 288, by guid, responsible for supplying power to the RPP. For example, the data center information manager 544 may provide capacity and cumulative power allocation and utilization information for each of the UPS units 224A-C and the transfer switches 228A-B supplying power to the RPP of which the logical circuit breaker panel 1000 has been generated. That is, the power capacity (KW CAP), power allocated (KW AL.), and the power used (KW USED), for the transfer switch 228 supplying power to the RPP 108, the remote power panel guid identification information 1004 may include a summation of power used and power allocated for other remote power panels 108B and/or multiple remote power panels 108. Similarly, the power source information section 1020 may include information for the UPS 224 supplying power to the transfer switch 228. That is, the power capacity (KW CAP), power allocated (KW AL.), and the power used (KW USED), for the UPS 224 supplying power to the transfer switch 228 may include a summation of power used and power allocated for other transfer switches 228.

The logical circuit breaker panel 1000 may also include a power use information section 1016. The power use information section 1016 generally includes a breakdown of the amount of current being used for each phase provided to the RPP. In some instances, it may be important to ensure that the power provided to the RPP 108 is phase balanced. In other words, the current per phase should not deviate more than a certain amount from other phases. The power use information section 1016 may also provide a percentage of allocated watts allocated in use by the RPP 108.

Figure 11:
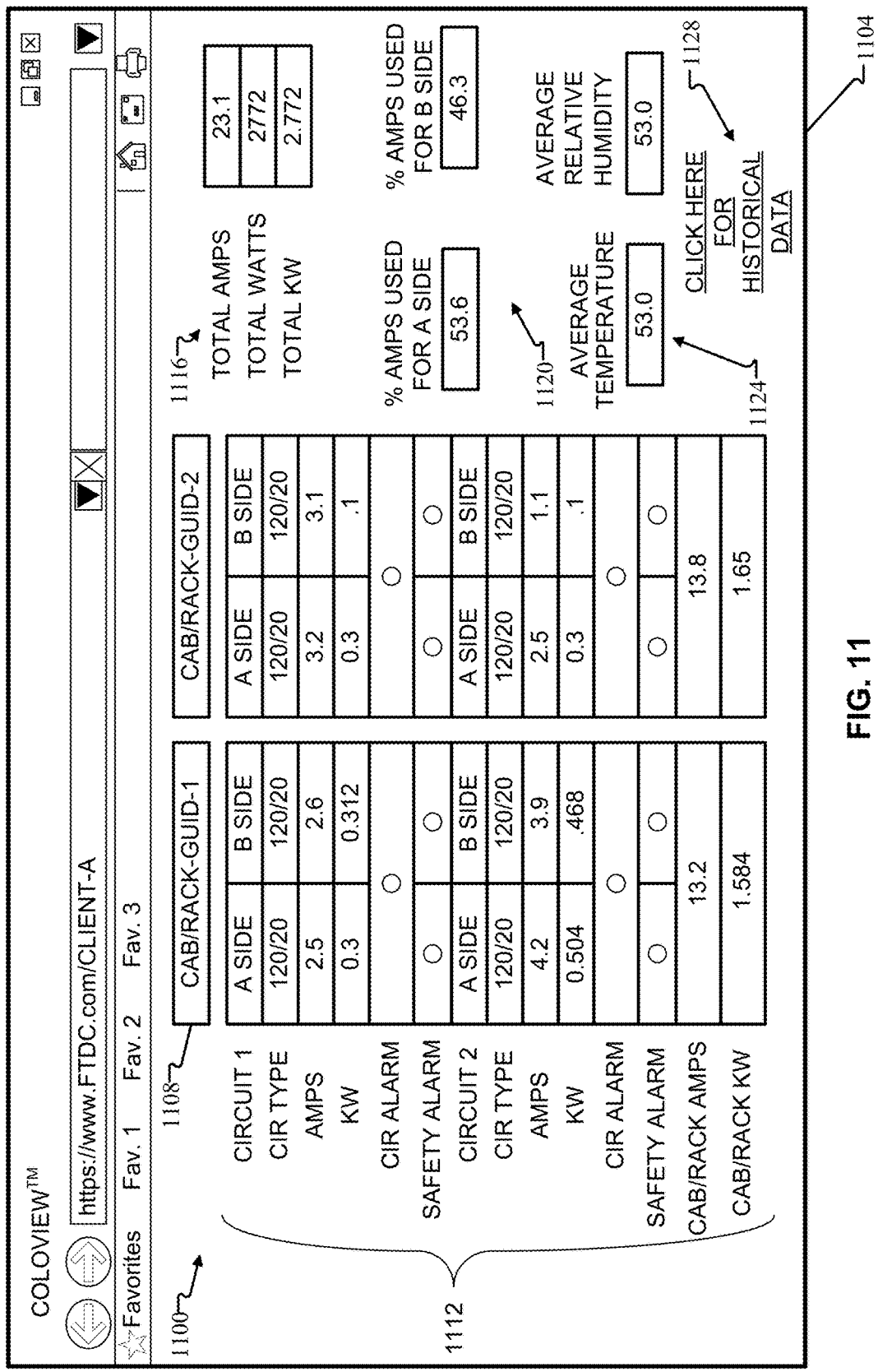
FIG. 11 depicts an example of a graphical user interface displaying details related to power use and utilization for one or more cabinets/racks associated with a client in accordance with the invention.

FIG. 11 illustrates a display interface 1100 providing client specific information for view by one or more clients, in accordance with embodiments of the present disclosure. The display interface 1100 may be accessed via the client accessible data center information manager 416 as a webpage 1104 or some other means, such that the data center information manager 628 of the client accessible data center information management module 624 collects, parses, and/or retrieves client specific information. As previously discussed, the data center infrastructure manager 408 may receive status information, operating information, and client information from each of the data center and power distribution elements 424. From this received information, the data center infrastructure management module 536 may rely on the data center information manager 544 to organize and track such information. More particularly, the data center information manager 544 may track and record client specific information, such as how much power, in watts and kVA, has been allocated to a specific client, which breaker positions and which remote power panels 108 have been assigned to the client, and further what UPS units 224A-C feed the respective remote power panel 108. Such information may further be pulled from and/or provided from the logical circuit breaker panel generator 540, which is configured to generate a logical circuit breaker panel, for each remote power panel 108, based on the physical breaker positions within the remote power panels 108, the instantaneous or real-time measured current for each breaker position, the circuit type, client allocated power, circuit voltage, and any circuit warnings. Such information may be stored or otherwise saved to a database, such as database 428, 520. The database 620 of the client accessible data center information manager 416 may then be provided with such data from the data center infrastructure manager 408. Accordingly, the data center information manager 628 may be responsible for verifying and authenticating client requests, such as client requests to view client specific information. Further, since the client accessible data center information management module 624 may have access to data for all clients, the data center information manager 628 may be required to filter such client information based on a unique client identifier, such as a client name and/or number. Accordingly, the graphical user interface/generator 632 of the client accessible data center information management module 624 may format and render such retrieved, and/or filtered information; such information may be presented in a manner similar to the display interface 1100 depicted in FIG. 11.

In accordance with at least some embodiments of the present disclosure, the display interface 1100 may generally be available as a webpage 1104. That is, a client, using a client device 420, may enter a Uniform Resource Language (URL) descriptor in the address of the box of the webpage in order to initiate the viewing process. As previously discussed, because the database 620 of the client accessible data center information manager 416 may have data for various clients, the data center information manager 628 will be responsible for verifying and authenticating client requests, such as client requests to view client specific information. Accordingly, a client will be required to enter a username and password or perform some other method of authentication to gain access to the data displayed in the one or more display interfaces 1100.

The display interface 1100, or WebPage, is available to provide clients with information specific to the power usage of one or more client computing devices, such as a server, for example, at a circuit level. As illustrated in FIG. 11, a client, such as CLIENT-A, may contract with a colocation datacenter for power to accommodate client computing devices located in cab/rack 104 and identified by a cab/rack guid 1108. Accordingly, at least based on one or more values output from the logical circuit breaker panel generator 540, the current, power utilization, and alarm values 1112 may be displayed according to their respective circuits in their respective racks. For example, a first circuit of cab/rack-guid-1 may include an A and a B side for redundancy purposes as previously discussed. Circuit 1A may be a 120V circuit with a 20 amp rated breaker. A real-time, or instantaneous, current reading for Circuit 1A may be 2.5 amps with a total power usage of 0.3 KW. Similarly, Circuit 1B may be a 120V circuit with a 20 amp rated breaker. A real-time, or instantaneous, current reading for Circuit 1B may be 2.6 amps with a total power usage of 0.312 KW. Accordingly, a client who has been allocated 10 amps, and/or 1200 watts total for Circuit 1 would understand that they may add additional equipment to Circuit 1 provided that the additional equipment does not draw more than 4.9 amps total, or 2.5 amps on a first side and 2.4 amps on a second side.

Further, a circuit alarm and a safety alarm may be provided to the client. That is, the circuit alarm may provide an indication and/or notification when the total power of Circuit 1, that is the A side added to the B side, exceeds a previously defined power allocation amount. Accordingly, as illustrated in the display interface 1100, the total power of Circuit 1A is 0.612 KW; if the allocated power for Circuit 1A was 600 Watts, a notification and/or indication would be provided by the circuit alarm. Similarly, a safety notification and/or indication may be provided if the total power and/or total current for either of the logical circuits 1A or 1B exceeds a predetermined safety threshold. That is, the safety threshold may be, for example, the 80% NEC rating for the circuit breaker. Accordingly, if circuit 1A exceeds 16 amps, a safety notification and/or indication might be illustrated at the display interface 1100. As illustrated in at least FIG. 11, data similar to Circuit 1 may be displayed for Circuit 2 as well as for Circuit 1 and Circuit 2 of the cab/rack-guid-2.

The display interface 1100 may further provide information directed to total instantaneous, or real-time, power usage. For example, the total amps, total watts, and total kilowatts may be provided in section 1116. The total amps, total watts, and total kilowatts may provide a client with the necessary information to determine if an amount of contracted for or purchased power is sufficient for current and/or future operations. In addition, the display interface 1100 may include section 1120 providing the total current utilization per redundancy side. For example, 53.6% of the total 23.1 amps are drawn from the A side while 46.3% of the total 23.1 amps are drawn from the B side. Such information may allow a client to understand and/or identify potential issues affecting redundancy. In addition, the display interface 1100 may include real-time, or instantaneous, environmental operating conditions for the rack/cabinet 104 and/or the data room 100 in general. Accordingly, the client, via access to the display interface 1100, may be provided with the knowledge necessary to determine whether or not the environmental operating conditions within the colocation center are within the manufacturer recommended operating parameters, provided the client has access to the manufacturer recommended operating parameters for their equipment. Further, as a means of providing the client with additional information, trending, or historical, data for any of the values displayed within the display interface 1100 may be provided to the client. For example, the client may be able to click on a hyperlink 1128 to access such information as will be described with respect to FIG. 13.

Figure 12:
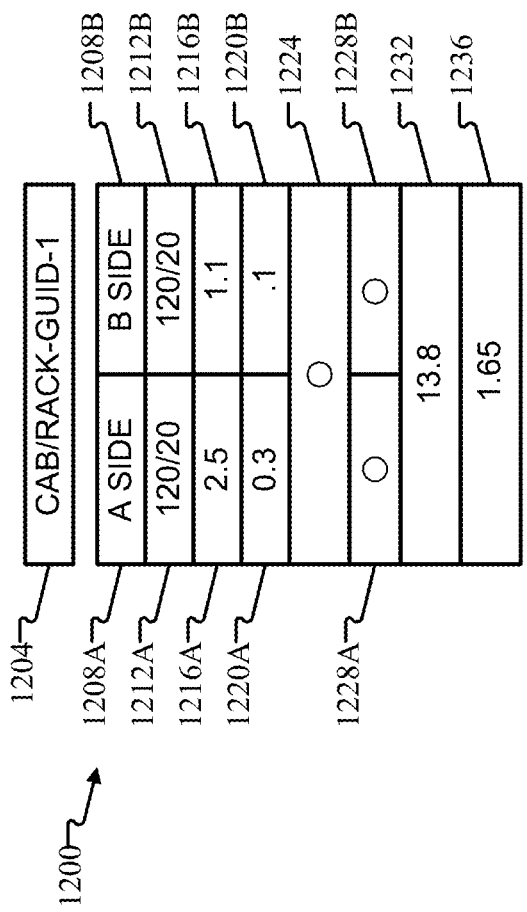
FIG. 12 depicts additional details with respect to the example of the graphical user interface of FIG. 11.

FIG. 12 provides additional detail with regard to the one or more values displayed in the display interface 1100. For example, FIG. 12 includes the cab/rack-guid-1 identifier 1204, which may be provided by the guid 816 of data structure 812. The A side 1208A of a first circuit and the B side 1208B of the second circuit may correspond to one or more logical circuit guid 944. The real-time, or instantaneous, current values 1216A and 1216B may be provided by the real-time, or instantaneous, current reading 972 for a respective logical circuit. Similarly, the real-time, or instantaneous, power values 1220A and 1220B may be provided by the real-time, or instantaneous, power calculation 976 for a respective logical circuit. Additionally, the circuit alarm 1224 and the safety alarm 1228A and 1228B may be provided by the logical circuit warnings/alarms 984. Lastly, and as previously mentioned, the total instantaneous or real-time current reading 1232 and power reading 1236 may tracked by the data center information manager 544 and or the data center information manager 628; accordingly the total current quantities and power quantities for the cab/rack having the cab/rack-guid-1 1204 may be provided to the client.

Figure 13:
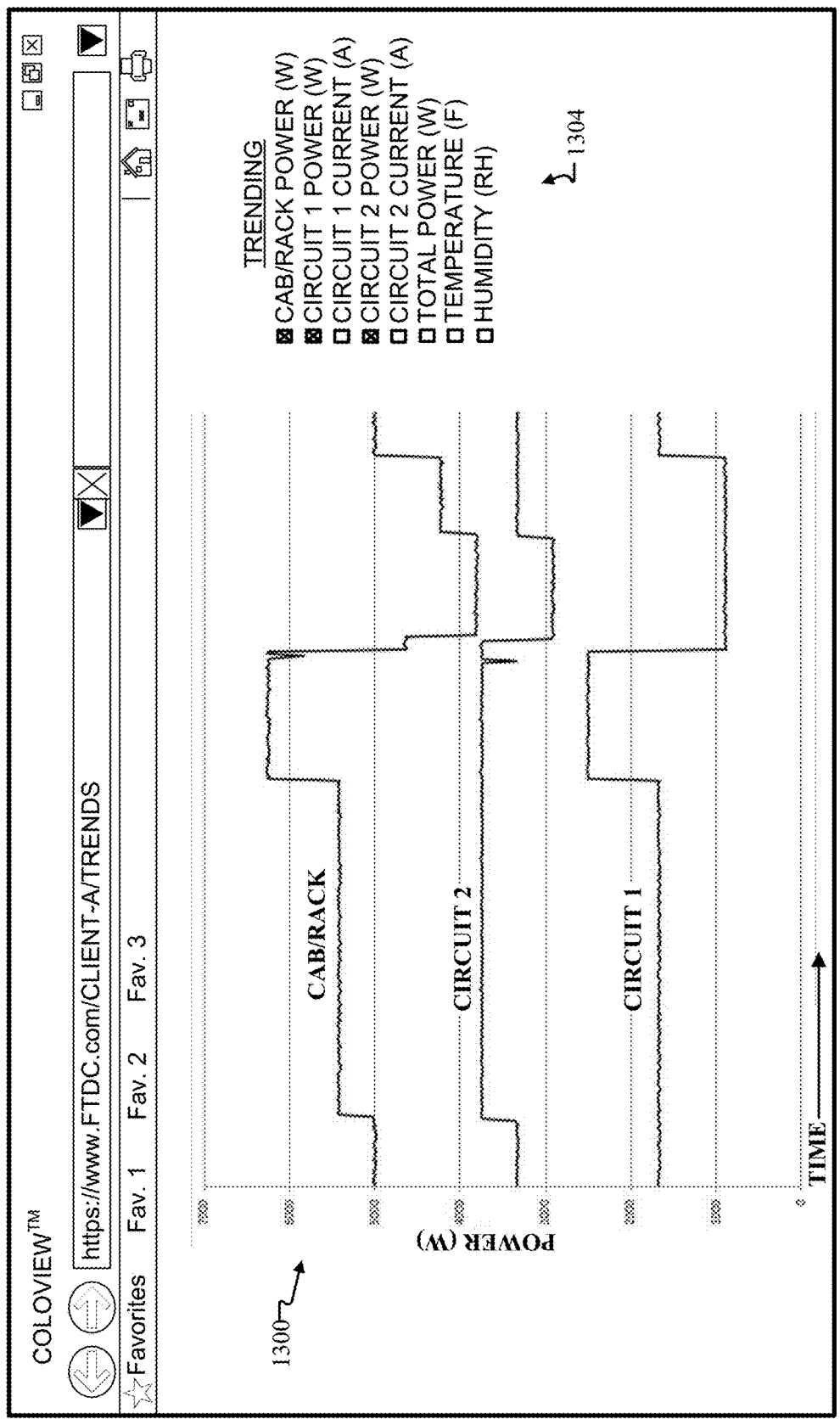
FIG. 13 illustrates an example of one or more plots associated with data displayed in accordance with FIGS. 11 and 12.

FIG. 13 illustrates additional tools providing information relating to trending and historical data to a client in accordance with embodiments of the present disclosure. In particular, a plot 1300 may be accessed via the display interface 1100 as previously mentioned. Accordingly, historical data associated with one or more measured and/or tracked items 1304 may be provided to a client, where the client may be a user. For example, and as illustrated in FIG. 13, a plot illustrating power consumption, in watts, over time for a first and second circuit may be displayed to a client. In addition, a plot illustrating total power consumption, in watts, for a specific cab/rack may also be displayed to the client. Further, a list 1304 including, but not limited to cab/rack power, status and circuit information for a first circuit, status and circuit information for a second circuit, temperature and relative humidity may be plotted, individually, or together as a group at plot 1300. Plot 1300 may be generated by the graphical user interface/generator 632 and further may be provided to an output 676, such as a display, of the client communication device 420.

Such data and/or plots, may be provided to a client in order to not only track and provide a level of accountability related to power usage of the client and whether or not the client is operating within their contracted power allocations, but plot 1300 may also be used to track and provide a level of accountability related to the operation of the colocation data center. That is, should the temperature and/or relative humidity values, for example, exceed a contracted SLA, the data center operator may be required to provide some sort of compensation to a client. Further, plots 1300 may allow a client the ability to view and/or track usage trends overtime and use such information for future capacity planning. As one example, based on past power usage, the client may determine that although they are operating within their contracted power allocations, during some periods of the year, power consumption increases due in part to customer demand. Accordingly, the client may want to increase power allocations, turn on new equipment to handle customer demand, and/or perform some other operation.

Figure 14:
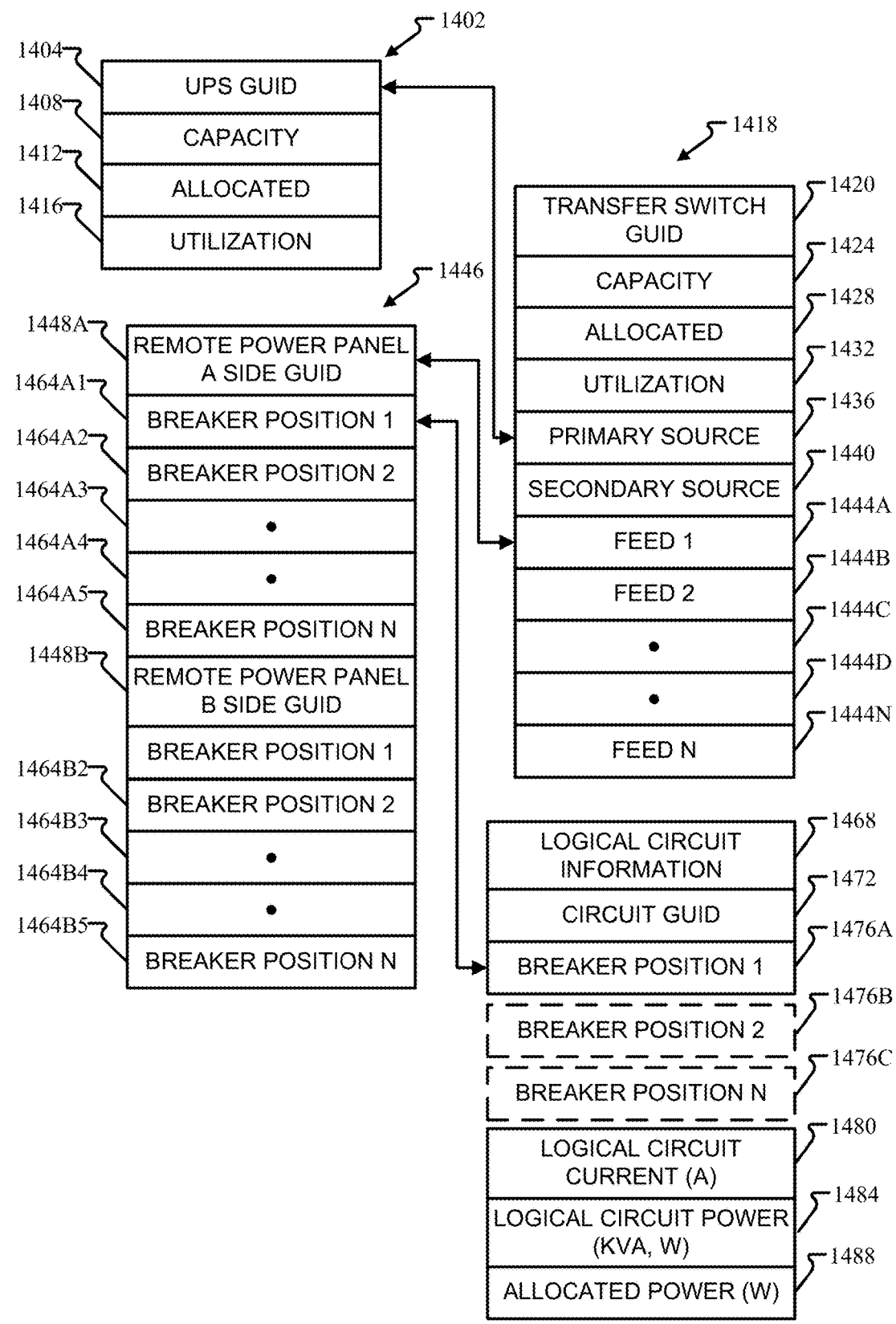
FIG. 14 illustrates one or more data structures having one or more fields in accordance with the invention.

FIG. 14 illustrates one or more data structures having one or more fields and an association between each of the data fields in accordance with some embodiments of the present disclosure. As illustrated in FIG. 14, one or more relational data structures including linking information are shown; such data structures may be utilized to track and/or record real-time, or instantaneous, allocated, and capacity power (and/or current utilization) levels for one or more components illustrated in FIGS. 1-6, for example. For example, and as previously discussed with reference to at least FIG. 2 and FIG. 10, an UPS 224 may supply power to one or more transfer switches 228. A transfer switch 228 may supply power to one or more RPP units 108. Each breaker position of the RPP 108 may be associated with a logical circuit having an amount of power allocated to such circuit. Accordingly, based on a linking between the UPS 224, the transfer switch 228, the RPP 108, and logical circuit information for one or more breaker positions within the RPP, power capacity, allocations, and use may be tracked from the individual breaker position all the way up to the UPS 224. Therefore, by tracking such information, it is possible to avoid situations where resources, such as power, are over allocated.

The data structure 1402 may generally be associated with one or more UPS units 224. Each UPS unit 224 may be identified with a unique identifier 1404, and while a capacity 1408 of a specific UPS unit 224 may be known, for example, 7500 KVA, the amount of power allocated 1412 and the power utilization 1416 depend on the components receiving their power from the UPS unit 224. Accordingly, a transfer switch 228 may be linked to one or more UPS units 224 via one or more linkings, keys, or identifiers.

As previously discussed with respect to at least FIG. 2, each transfer switch 228 may include a primary source of power and a secondary source of power. Accordingly, data structure 1418 specific to transfer switch 228 having a unique identifier 1420, may include primary power source 1436 and secondary power source 1440 linkings, keys, or identifiers. Therefore, in accordance with embodiments of the present disclosure, the transfer switch 228 having the unique identifier 1420 may be linked to the UPS identifier 1404 via the primary source field 1436. Similar to the UPS 224, the power capacity of the transfer switch 228 may be known; however, the power allocation information in location 1428 and utilization information in location 1432 may depend on one or more components that receive their power from the transfer switch 228. Accordingly, a transfer switch 228 may be linked to one or more RPPs 108 via the feed linkings 1444A-1444N. That is, each feed of a transfer switch may be linked to an RPP 108, or a side of an RPP 108 having a unique identifier 1448.

The RPP data structure 1446 may generally be associated with multiple RPPs 108. Although illustrated as including an A side and a B side of an RPP 108, the RPP data structure 1446 may include only those fields for an A side or a B side. Similar to the transfer switch 228 and the UPS 224, the capacity of the RPP 108 may be known; however, the allocation information and utilization information of the RPP 108, and hence the RPP data structure 1446, is calculated based on the use and allocation of the logical circuits that rely on, or are comprised of, the one or more breaker positions 1464A1-1464B5. Accordingly, each breaker position within the data structure 1446 may be linked to a logical circuit information data structure 1468.

Logical circuit information data structure 1468 may be the same as or similar to the logical circuit information data structure 824 previously discussed. Accordingly, the data structure 1468 may include information identifying or indicating that the logical circuit having guid 1472 includes one or more breaker positions 1476A-C. Further, the logical circuit having guid 1472 may include an amount of power allocated 1488 for such circuit. Data structure 844 may provide additional information based on each of the breaker positions; however, in accordance with embodiments of the present disclosure, the logical circuit current 1480 and the logical circuit power 1484 may be provided by the logical circuit breaker panel generator 540. For example, the logical circuit current 1480 and the logical circuit power 1484 may be the same or similar to logical circuit current 972 and logical circuit power 980 respectively. Accordingly, the logical circuit breaker panel generator 540 may provide logical circuit information to at least one of the data structures illustrated in FIG. 14. Accordingly, allocation information, capacity, and use information, illustrated in power source information 1020 may be then be calculated using data contained in the one or more data structures illustrated in FIG. 14, as will be further described herein.

Figure 15:
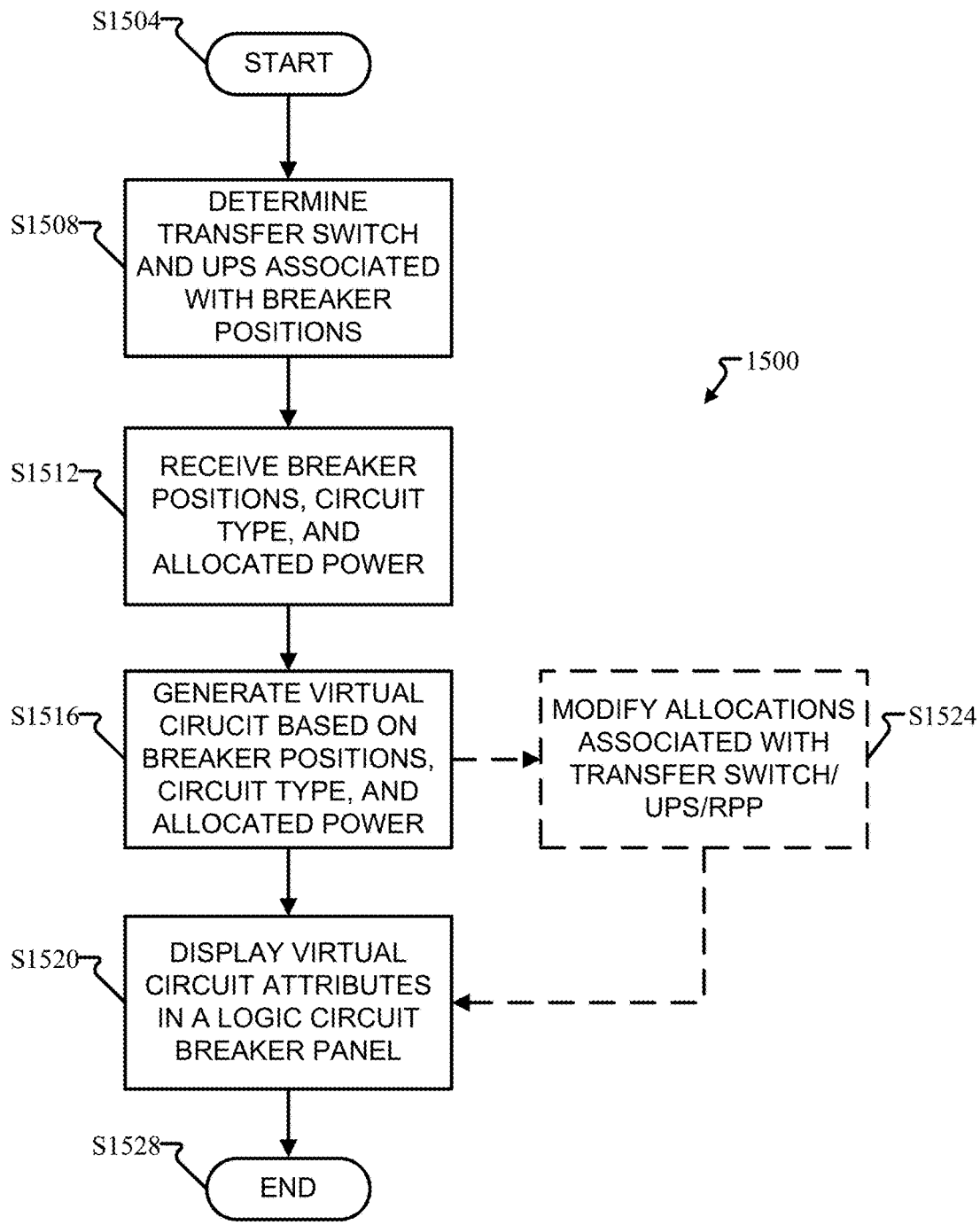
FIG. 15 is a flow diagram depicting operating details relating to client power monitoring and utilization in accordance with the invention.

Referring now to FIG. 15, a method 1500 of determining and displaying logical circuit information will be discussed in accordance with embodiments of the present disclosure. Method 1500 is in embodiments, performed partially or wholly by a device, such as the data center infrastructure manager 408 and/or the client accessible data center information manager 416. More specifically, one or more hardware and software components may be involved in performing method 1500. In one embodiment, one or more of the previously described modules and/or devices perform one or more of the steps of method 1500. The method 1500 may be executed as a set of computer-executable instructions executed by a computer system, the data center infrastructure manager 408, and/or the client accessible data center information manager 416 and encoded or stored on a computer-readable medium. Hereinafter, the method 1500 shall be explained with reference to systems, components, modules, software, etc. described with FIGS. 1-14.

Method 1500 may continuously flow in a loop, flow according to a timed event, or flow according to a change in an operating or status parameter. Method 1500 is generally initiated at step S1504, where a UPS 224 and a transfer switch 228 association is to be made. At step S1508, the UPS 224 and the transfer switch 228 may be determined based on one or more breaker positions, for example, the breaker positions assigned to a cabinet/rack and/or client performed in method 700. Once the breaker positions, transfer switch, and UPS have been associated, the method 1500 may proceed to step S1512 where identifying information related to breaker positions, a type of circuit, and/or an amount of allocated power for the circuit is received. For example, such information may be received from one or more data structures described in FIG. 8 and may be provided as an input to the logical circuit breaker panel generator 540. Accordingly, at step S1516, a virtual circuit based on the breaker positions, circuit type, and allocated power may be generated. Alternatively, or in addition, the identifying information related to breaker positions, a type of circuit, and/or an amount of allocated power for the circuit received in step S1512 may be mapped to a logical circuit such that one or more of the current, power, utilization, alarm, and warning readings 948-984 may be generated. Accordingly, such information may then be displayed in a logical circuit breaker panel at step S1520, such as the logical circuit breaker panel illustrated and describe with respect to FIG. 10. In some embodiments, optional step S1524 may be performed. Optional step S1524 may increment, or decrement, allocations, such as power and current allocations, at the UPS 224, transfer switch 228, and/or RPP 108. That is, the power allocations of the UPS 224, transfer switch 228, and/or RPP 108 associated with the logical circuit may be adjusted to reflect the allocated power assignment in step S1508.

Figure 16:
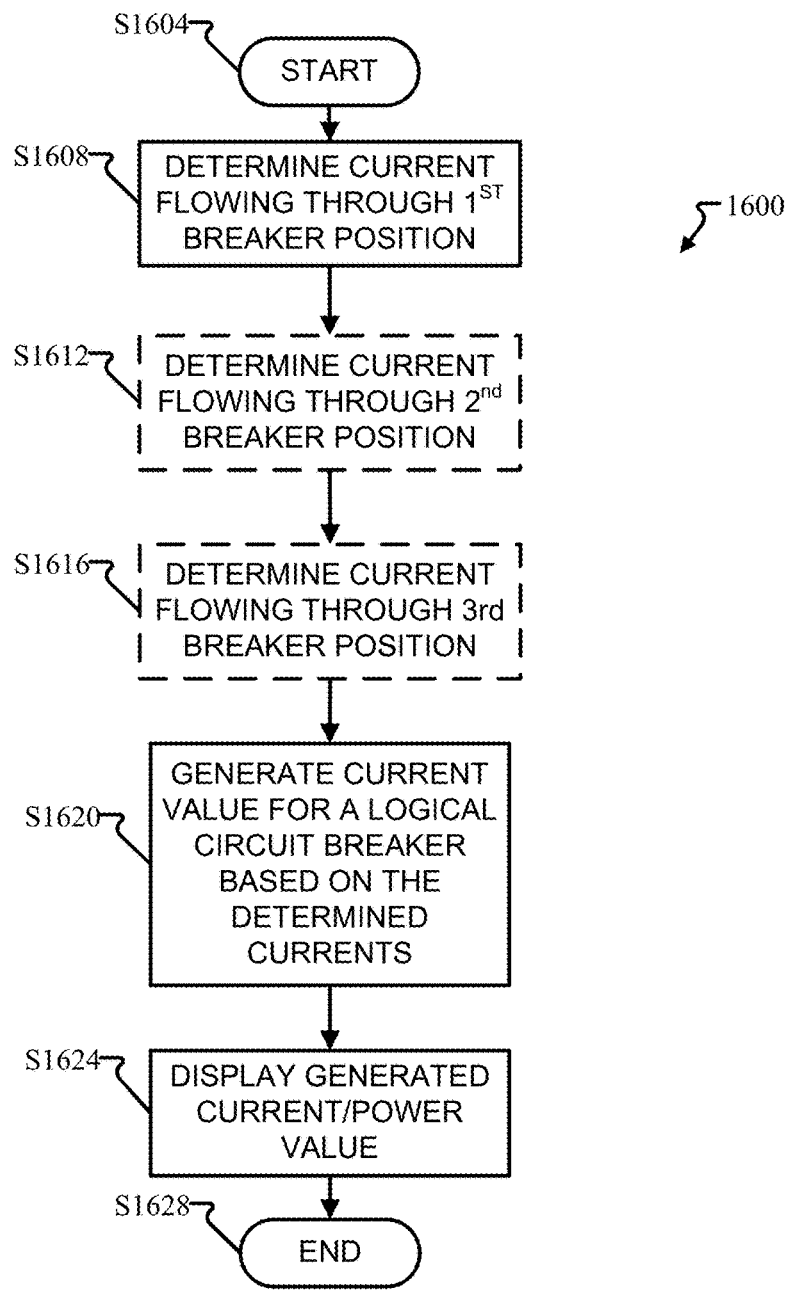
FIG. 16 is a flow diagram depicting current and power monitoring in accordance with the invention.

Referring now to FIG. 16, a method 1600 of determining the real-time, or instantaneous, current in amps and the power in watts for a logical circuit is described in accordance with embodiments of the present disclosure. Method 1600 is in embodiments, performed partially or wholly by a device, such as the data center infrastructure manager 408. More specifically, one or more hardware and software components may be involved in performing method 1600. In one embodiment, one or more of the previously described modules and/or devices perform one or more of the steps of method 1600. The method 1600 may be executed as a set of computer-executable instructions executed by a computer system, the data center infrastructure manager 408, and encoded or stored on a computer-readable medium. Hereinafter, the method 1600 shall be explained with reference to systems, components, modules, software, etc. described with FIGS. 1-15.

Method 1600 may continuously flow in a loop, flow according to a timed event, or flow according to a change in an operating or status parameter. Method 1600 is generally initiated at step S1604, where a current and/or power usage refresh is requested. Accordingly, at step S1608, the current flowing through a first breaker position associated with a logical circuit is determined. In accordance with embodiments of the present disclosure, the current flowing through the first breaker position associated with a logical circuit may be determined utilizing the current transformer, such as current transformer 332, and data acquisition module, such as data acquisition module 340, as previously described. That is, the data acquisition module 340 may read and convert a measurement associated with an amount of current flowing through or near the current transformer 332 for use by the data center infrastructure manager 408. Such a reading may then be provided to the logical circuit breaker panel generator 540. Similarly, for a logical circuit relying on multiple breaker positions, such as a 208V and/or three-phase circuit, the current flowing through the additional breaker positions associated with the logical circuit may be determined at step S1612 and step S1616 utilizing the current transformer in the same or similar manner describe with respect to step S1608. After the one or more current readings for each of the breaker positions have been obtained, the method 1600 may proceed to step S1620 where a logical circuit current, such as logical circuit current 972, may be generated. That is, the logical circuit current 976 for a logical circuit comprising a signal breaker position may be the actual current read for the breaker position. The logical circuit current 972 for a logical circuit comprising two breaker positions, such as a 208V circuit, may be an aggregate of the actual current read for the two breaker positions. Similarly, the logical circuit current 972 for a logical circuit comprising three breaker positions, such as a three-phase circuit, may be an aggregate of the actual current read for the three breaker positions. Accordingly, once the circuit current 972 has been determined in step S1620, the power 976 for the logical circuit may be calculated, and the circuit current 972 and the circuit power 976 may be displayed in accordance with the logical circuit breaker panel 1000 of FIG. 10, the display interface 1100 of FIG. 11, and/or as trending/historical information of plot 1300 in FIG. 13 for example. Method 1600 may then repeat and/or end at step S1628.

Figure 17:
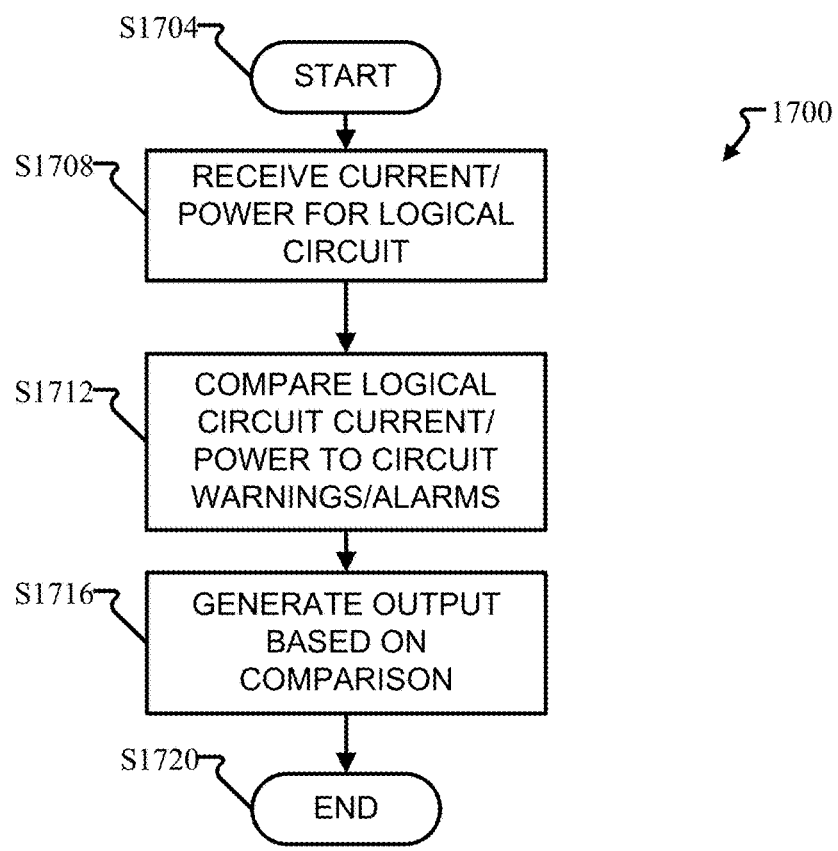
FIG. 17 is a flow diagram depicting a process for providing an output in response to a current and/or power level exceeding a warning level and/or an alarm level in accordance with the invention.

Referring now to FIG. 17, a method 1700 of determining warnings and/or alarm outputs for a logical circuit is described in accordance with embodiments of the present disclosure. Method 1700 is in embodiments, performed partially or wholly by a device, such as the data center infrastructure manager 408. More specifically, one or more hardware and software components may be involved in performing method 1700. In one embodiment, one or more of the previously described modules and/or devices perform one or more of the steps of method 1700. The method 1700 may be executed as a set of computer-executable instructions executed by a computer system, the data center infrastructure manager 408, and encoded or stored on a computer-readable medium. Hereinafter, the method 1700 shall be explained with reference to systems, components, modules, software, etc. described with FIGS. 1-16.

Method 1700 may continuously flow in a loop, flow according to a timed event, or flow according to a change in an operating or status parameter. Method 1700 is generally initiated at step S1704, and a current and/or power for a logical circuit may be received at step S1708. That is, the current 972 of a logical circuit and/or the power 976 of a logical circuit may be utilized to determine one or more warnings and/or alarms. Accordingly, the logical circuit current and/or power may be compared to one or more warning/alarm thresholds at step S1712, such as the current and power thresholds 984. At step S1716, if the current 972 and/or the power 976 for the logical circuit exceed one or more of the thresholds, an output indicating such may be generated. The output may be, for example, an indication as previously described with respect to FIGS. 10-12. Alternatively, or in addition, the output may be some other notification, such as a text message and/or email providing a client some form of notification that a current and/or power of a circuit has exceeded one or more thresholds—such as a contractually allocated amount of power and/or a NEC safety threshold. Method 1700 may then end at step S1720

Figure 18:
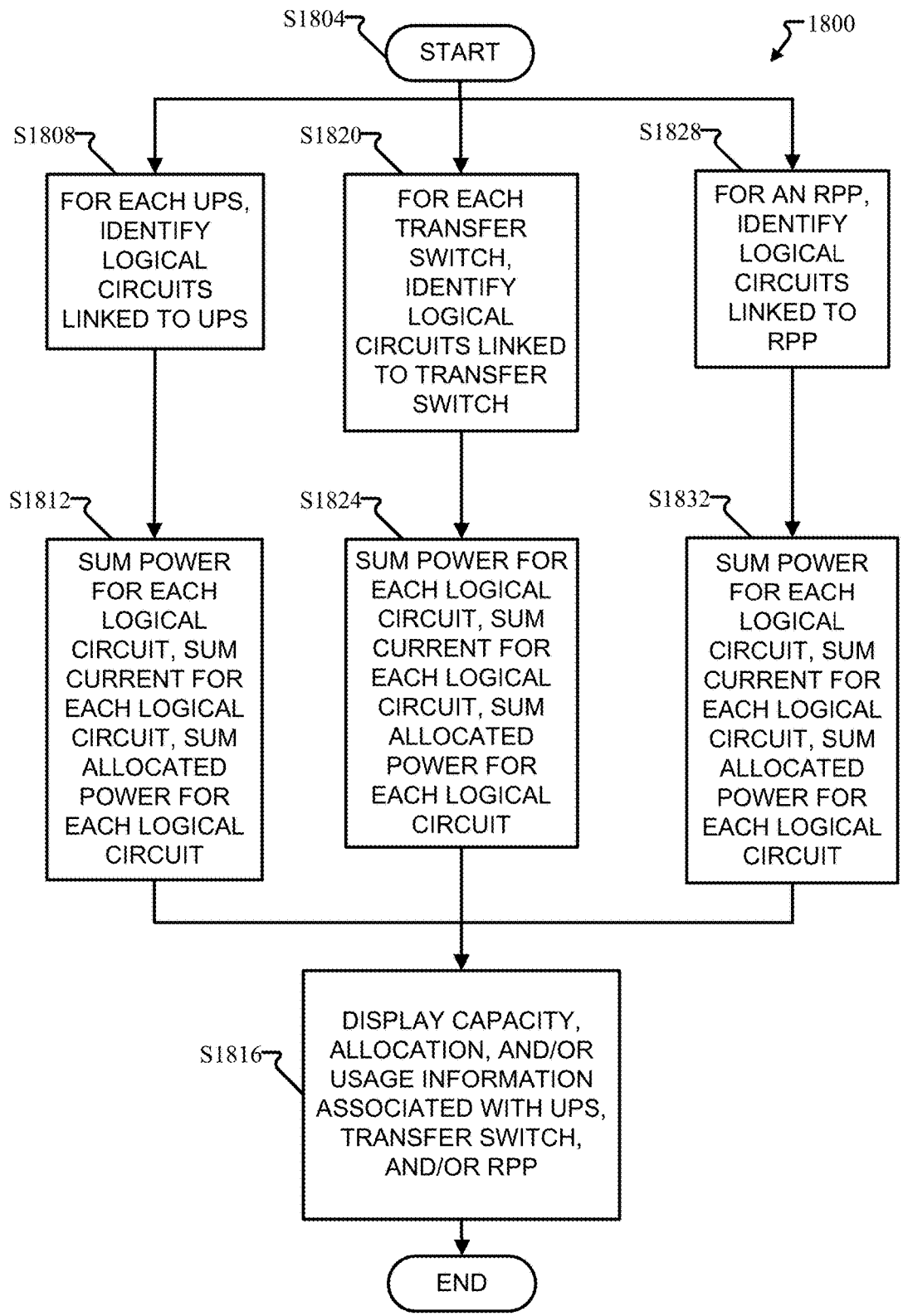
FIG. 18 is a flow diagram depicting operating details relating to data center power allocation and usage tracking in accordance with the invention.

Referring now to FIG. 18, a method 1800 of determining a real-time, or instantaneous, current and/or power allocated and/or usage amount is described in accordance with embodiments of the present disclosure. Method 1800 is in embodiments, performed partially or wholly by a device, such as the data center infrastructure manager 408. More specifically, one or more hardware and software components may be involved in performing method 1800. In one embodiment, one or more of the previously described modules and/or devices perform one or more of the steps of method 1800. The method 1800 may be executed as a set of computer-executable instructions executed by a computer system, the data center infrastructure manager 408 and encoded or stored on a computer-readable medium. Hereinafter, the method 1800 shall be explained with reference to systems, components, modules, software, etc. described with FIGS. 1-17.

Method 1800 may continuously flow in a loop, flow according to a timed event, or flow according to a change in an operating or status parameter. Method 1800 is generally initiated at step S1804, where an update or refresh of real-time, or instantaneous, current and/or power is requested. In particular, at step S1808, for each UPS, the logical circuits linked to the UPS are identified. For example, utilizing one or more of the data structures illustrated in at least FIG. 14, the logical circuit information 1468 may be determined utilizing relational linking between a UPS 224, transfer switch 228, and remote power panel 108. Accordingly, at step S1812, each of the power, current, and/or allocated power/current may be summed, or added together, resulting in capacity values 1408, allocated values 1412, and utilization values 1416 for each of the UPS 224 units. Method 1800 may then display such values at step S1816.

In addition, method 1800 may identify logical circuits linked to each transfer switch 228 and generate allocated and usage information for each of the transfer switches 228. That is, at step S1820, the logical circuits are identified for each transfer switch S1820. For example, utilizing one or more of the data structures illustrated in at least FIG. 14, the logical circuit information 1468 may be determined utilizing relational linking between a transfer switch 228 and a remote power panel 108. Accordingly, at steps S1824, each of the power, current, and/or allocated power/current may be summed, or added together, resulting in capacity values 1424, allocated values 1428, and utilization values 1432 for each of the transfer switches 228. Method 1800 may then display such values at step S1816.

In addition, method 1800 may identify logical circuits linked to each remote power panel 108 and generate allocated and usage information for each of the remote power panels 108. That is, at step S1824, the logical circuits are identified for each RPP 108. For example, utilizing one or more of the data structures illustrated in at least FIG. 14, the logical circuit information 1468 may be determined utilizing relational linking of the RPP 108. Accordingly, at steps S1832, each of the power, current, and/or allocated power/current may be summed, or added together, resulting in capacity values 1424, allocated values 1428, and utilization values 1432 for each of the transfer switches 228. Method 1800 may then display such values at step S1816.

In accordance with embodiments of the present disclosure, each of the allocated and usage information values for each of the UPS 224, transfer switch 228, and RPP 108 may be displayed at step S1816. For example, within the logical circuit breaker panel 1000, the capacity, allocations, and usage information may be displayed for each UPS 224 and transfer switch 228 linked to the RPP 108 having the specified guid 1004. Accordingly, the power source information section 1020 may display information identifying the UPS 224 and the transfer switch 288, by guid, responsible for supplying power to the RPP and respective capacity and cumulative power allocation and utilization information for each of the UPS units 224A-C and the transfer switches 228A-B supplying power to the RPP of which the logical circuit breaker panel 1000 has been generated. Similarly, the panel power available 1012 section provides summary information directed to the power capacity of the RPP, use, and availability of power. That is, the panel power available 1012 section may display the power, in KVA, allowed at the RPP, the total power, in KVA, being used by the RPP, how much power, in KVA, has been allocated, and how much power, in KVA, is available based on the amount allocated and the amount being currently used.

Further, for example, the present technology can have the following configurations.

(1)

A system comprising:
at least one breaker panel receiving power from at least one power distribution element, said at least one breaker panel including a plurality breaker positions;
a first current sensor residing at a first breaker position of the plurality of breaker positions in the breaker panel;
a second current sensor residing at a second breaker position of the plurality of breaker positions in the breaker panel; and
a data center infrastructure manager, wherein the data center infrastructure manager generates a first value for a first virtual circuit derived from a first current measurement provided by the first current sensor, wherein the data center infrastructure manager generates a second value for a second virtual circuit derived from a second current measurement provided by the second current sensor, wherein the data center infrastructure manager generates a third value by summing the first value for the first virtual circuit and the second value for the second virtual circuit, and
wherein the data center infrastructure manager outputs the third value to a display of a computing device.

(2)

The system according to (1), further including a communication network, wherein the third value is provided over a communication network to a second computing device.

(3)

The system according to (2), wherein the communication network includes a portion of a public communication network.

(4)

The system according to any one of (1) to (3), further including a first rack including a second computing device, wherein the first current measurement is for a first electrical circuit within the rack and the second current measurement is for a second electrical circuit within the rack.

(5)

The system according to any one of (2) to (4), wherein the data center infrastructure manager provides the first value and the second value to the second computing device over the communication network, wherein the first value, the second value, and the third value are provided in real-time.

(6)

The system according to any one of (2) to (5) further including a third current sensor residing at a third breaker position in the breaker panel, wherein the first value for the first virtual circuit is derived from the first current measurement and the third current measurement.

(7)

The system according to any one of (2) to (6), further including a second breaker panel, wherein the at least one breaker panel and the second breaker panel are electrically connected to the power distribution element; and a third current sensor residing at a breaker position in the second breaker panel, wherein the data center infrastructure manager compares the first value for the first virtual circuit to a first predetermined threshold, wherein the data center infrastructure manager generates a fourth value for a third virtual circuit derived from a current measurement provided by the third current transformer and compares the fourth value for the third virtual circuit to a second predetermined threshold, and wherein the data center infrastructure manager generates an allocation value for the power distribution element derived from at least the first predetermined threshold and the second predetermined threshold.

(8)
The system according to any one of (1) to (7), wherein the power distribution element is a transfer switch.

(9)
The system according to (8), further including: a second transfer switch; a third breaker panel electrically connected to the second transfer switch; and an uninterruptable power supply, wherein the first transfer switch and the second transfer switch are electrically connected to the UPS and wherein an allocation value for the UPS is derived from the allocation value for the first transfer switch and an allocation value for the second transfer switch.

(10)
The system according to any one of (1) to (9), further including: at least one sensor providing at least one of temperature and humidity information to the data center information manager, wherein the datacenter information manager provides the at least one of the temperature and humidity information to the display of the computing device.

(11)
A system, comprising:
a processor;
a memory;
a communication interface; and
one or more instructions stored in the memory, wherein the one or more instructions, when executed by the processor, are operable to:
receive a current reading corresponding to a breaker position in a breaker panel, the breaker panel receiving power from a power distribution element,
generate a first logical circuit based on the received current reading and a predetermined voltage, wherein the first logical circuit includes one or more of a current value for the first logical circuit, a power value for the first logical circuit, and an allocation value for the first logical circuit, wherein the allocation value for the first logical circuit is at least one of a power allocation and a current allocation,
output at least one of the current value for the first logical circuit, the power value for the first logical circuit, and the allocation value for the first logical circuit to a display of a first computing device, and
output, via the communication interface, at least one of the current value for the first logical circuit, the power value for the first logical circuit, and the allocation value for the first logical circuit to a second computing device.

(12)
The system according to (11), further including instructions operable to: receive a second current reading corresponding to a second breaker position in the breaker panel, and generate the first logical circuit based on the received second current reading.

(13)
The system according to (12), wherein the communication network is a public network.

(14)
The system according to any one of (11), further including instructions operable to: receive a second current reading corresponding to a breaker position in a second breaker panel, generate a second logical circuit based on the received second current reading, and generate a power utilization value for the power distribution element based on the power value for the second logical circuit and the power value for the first logical circuit.

(15)
The system according to (14), further including instructions to: generate an allocation value for the power distribution element based on a power allocation value for the second logical circuit and the power allocation value for the first logical circuit.

(16)
The system according to (15), further including instructions to: compare the allocation value for the power distribution element to the power utilization value for the power distribution element, and output, via the communication interface, an indication when the power utilization value for the power distribution element exceeds the allocation value for the power distribution element.

(17)
The system according to any one of (11) to (16), wherein the power distribution element is a transfer switch.

(18)
The system according to any one of (16) to (17), further including instructions to: receive a third current reading corresponding to a breaker position in a third breaker panel, generate a third logical circuit based on the received third current reading, receive a fourth current reading corresponding to a breaker position in a fourth breaker panel, generate a fourth logical circuit based on the received fourth current reading, and generate a fourth power utilization value for a second power distribution element based on a power value for the third logical circuit and a power value for the fourth logical circuit, and generate a fifth power utilization value for a third power distribution element based on the power utilization value for the second power distribution element and the power utilization value for the power distribution element.

(19)
The system according to (18), wherein the second power distribution element is another transfer switch and the third power distribution element is an uninterruptable power supply.

(20)
The system according to any one of (11) to (19), wherein the power distribution element is an uninterruptable power supply.

(21)
The system according to any one of (11) to (20), wherein the current reading is provided by at least one current sensor.

(22)
The system according to any one of (11) to (21), further including instructions operable to: generate a graphical user interface including one or more of a current value for the logical circuit, the power value for the logical circuit, and the allocation value for the logical circuit.

(23)
The system according to any one of (11) to (22), further including instructions operable to: associate a unique identifier to the logical circuit.

(24)
A non-transient computer readable medium having stored thereon instructions that, when executed, cause a processor to perform a method, the instructions associated with a method of communicating power usage and distribution requirements within a datacenter to a consumer having data processing assets housed within said datacenter, said instructions including:

instructions for measuring, by a first current sensor, a first current associated with a first breaker position in a breaker panel of the datacenter;
instructions for measuring, by a second current sensor, a second current associated with a second breaker position in the breaker panel of the datacenter;
instructions for generating a first value for a first virtual circuit derived from the first current and the second current;
instructions for comparing the first value for the first virtual circuit to a selected first virtual circuit threshold;
instructions for measuring, by a third current sensor, a third current associated with a third breaker position in the breaker panel of the datacenter;
instructions for generating a second value for a second virtual circuit derived from the third current;
instructions for summing the first value for the first virtual circuit and the second value for the second virtual circuit; and
instructions for outputting the sum of the first value for the first virtual circuit and the second value for the second virtual circuit to a display of a computing device.

(25)
The non-transient computer readable medium according to (24), further including instructions for generating the first virtual circuit based on the first breaker position and the second breaker position in the breaker panel.

(26)
The non-transient computer readable medium according to any one of (24) to (25), further including instructions for generating at least one indication when the first value for the virtual circuit exceeds the selected first virtual circuit threshold.

(27)
The non-transient computer readable medium according to any one of (24) to (26), further including instructions for receiving at least one of temperature and humidity information from at least one sensor, and instructions for providing the received at least one of temperature and humidity information to the display of the computing device.

(28)
The non-transient computer readable medium according to any one of (24) to (27), wherein said breaker panel of the datacenter is electrically connected to a first device, and instructions for generating an allocation value for the first device, the allocation value derived from at least the sum of the first value for the first virtual circuit and the second value for the second virtual circuit.

(29)
The non-transient computer readable medium according to (28), further including instructions for comparing the allocation value for the first device to a selected first device threshold.

(30)
The non-transient computer readable medium according to any one of (24) to (29), wherein the first device is a first transfer switch.

(31)
A method of determining and recording power usage and distribution requirements within a datacenter, comprising:
measuring, by a first current sensor, a first current associated with a first breaker position in a breaker panel of the datacenter;
measuring, by a second current sensor, a second current associated with a second breaker position in the breaker panel of the datacenter;
generating a first value for a first virtual circuit derived from the first current and the second current;
comparing the first value for the first virtual circuit to a selected first virtual circuit threshold;
measuring, by a third current sensor, a third current associated with a third breaker position in the breaker panel of the datacenter;
generating a second value for a second virtual circuit derived from the third current; summing the first value for the first virtual circuit and the second value for the second virtual circuit; and
outputting the sum of the first value for the first virtual circuit and the second value for the second virtual circuit to a display of a computing device.

(32)
The method according to (31), further including generating the first virtual circuit based on the first breaker position and the second breaker position in the breaker panel.

(33)
The method according to any one of (31) to (32), further including generating at least one indication when the first value for the virtual circuit exceeds the selected first virtual circuit threshold.

(34)
The method of according to any one of (31) to (33), wherein the sum of the first value for the first virtual circuit and the second value for the second virtual circuit is communicated across a communication network.

(35)
The method according to (34), further including measuring, by the first current sensor, a fourth current associated with the first breaker position in the breaker panel of the datacenter; measuring, by the second current sensor, a fifth current associated with the second breaker position in the breaker panel of the datacenter; generating a third value for the first virtual circuit derived from the fourth current and the fifth current; measuring, by the third current sensor, a sixth current associated with the third breaker position in the breaker panel of the datacenter; generating a fourth value for the second virtual circuit derived from the sixth current; summing the third value for the first virtual circuit and the fourth value for the second virtual circuit; and providing the sum of the third value for the first virtual circuit and the fourth value for the second virtual circuit to the display of the computing device, wherein the sum of the first value for the first virtual circuit and the second value for the second virtual circuit and the sum of the third value for the first virtual circuit and the fourth value for the second virtual circuit are displayed at a same time.

(36)
The method according to (35), further including receiving at least one of temperature and humidity information from at least one sensor; and providing the received at least one of temperature and humidity information to the display of the computing device.

(37)
A method of determining and recording power usage and distribution requirements within a datacenter including:
measuring, by a first current sensor, a first current associated with a breaker position in a first breaker panel of the datacenter;
generating a first value for a first virtual circuit derived from the first current;
comparing the first value for the first virtual circuit to a selected first virtual circuit threshold;
measuring, by a second current sensor, a second current associated with a breaker position in a second breaker panel of the datacenter, wherein the first breaker panel of the datacenter and the second breaker panel of the datacenter are electrically connected to a power distribution element; generating a second value for a second virtual circuit derived from the second current; comparing the second value for the second virtual circuit to a selected second virtual circuit threshold;
generating an allocation value for the power distribution element, the allocation value derived from at least the selected first virtual circuit threshold and the selected second virtual circuit.

(38)
The method according to (37), further including comparing the allocation value for the power distribution element to a selected first power distribution threshold.

(39)
The method according to any one of (37) to (38), wherein the power distribution element is a first transfer switch.

(40)
The method according to (39), further including measuring, by a third current sensor, a third current associated with a breaker position in a third breaker panel of the datacenter; generating a third value for a third virtual circuit derived from the third current; comparing the third value for the third virtual circuit to a selected third virtual circuit threshold; measuring, by a fourth current sensor, a fourth current associated with a breaker position in a fourth breaker panel of the datacenter; generating a fourth value for a fourth virtual circuit derived from the fourth current; comparing the fourth value for the fourth virtual circuit to a selected fourth virtual circuit threshold; generating an allocation value for a second transfer switch, the allocation value derived from at least the selected third virtual circuit threshold and the selected fourth virtual circuit; generating an allocation value for an uninterruptable power supply (UPS), the allocation value for the UPS derived from at least the third predetermined threshold and the sixth predetermined threshold; and comparing the allocated value for the UPS to a seventh predetermined threshold for the UPS.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process, which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium such as a storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the invention have been described in detail herein, it is to be understood that the inventive concepts may be otherwise variously embodied and employed, and that the appended claims are intended to be construed to include such variations, except as limited by the prior art.

What is claimed is:
1. A system comprising:
at least one breaker panel receiving power from at least one power distribution element, said at least one breaker panel including a plurality of breaker positions;
a first current sensor residing at a first breaker position of the plurality of breaker positions in the breaker panel;
a second current sensor residing at a second breaker position of the plurality of breaker positions in the breaker panel; and
a data center infrastructure manager, wherein the data center infrastructure manager generates a first value for a first virtual circuit derived from a first current measurement provided by the first current sensor, wherein the data center infrastructure manager generates a second value for a second virtual circuit derived from a second current measurement provided by the second current sensor, wherein the data center infrastructure manager generates a third value by summing the first value for the first virtual circuit and the second value for the second virtual circuit;
a logical circuit breaker panel that displays remote power panel globally unique identifier ("guid") identification information received from the data center infrastructure manager, the logical circuit breaker panel further displaying information associated with each logical circuit as a function of the breaker positions; and
a client display interface that provides client specific information received from the data center infrastructure manager, the client display interface providing at least an identification of the client, a real time power usage, and a total current utilization per redundancy side;

a second breaker panel, wherein the at least one breaker panel and the second breaker panel are electrically connected to the at least one power distribution element; and a third current sensor residing at a breaker position in the second breaker panel, wherein the data center infrastructure manager compares the first value for the first virtual circuit to a first predetermined threshold, wherein the data center infrastructure manager generates a fourth value for a third virtual circuit derived from a current measurement provided by the third current sensor and compares the fourth value for the third virtual circuit to a second predetermined threshold, and wherein the data center infrastructure manager generates an allocation value for the at least one power distribution element derived from at least the first predetermined threshold and the second predetermined threshold.

2. The system of claim 1, further comprising a communication network, wherein the third value is provided over a communication network to a second computing device.

3. The system of claim 2, wherein the communication network includes a portion of a public communication network.

4. The system of claim 3, further comprising:
a first rack including a second computing device, wherein the first current measurement is for a first electrical circuit within the rack and the second current measurement is for a second electrical circuit within the rack.

5. The system of claim 3, wherein the data center infrastructure manager provides the first value and the second value to the second computing device over the communication network, wherein the first value, the second value, and the third value are provided in real-time.

6. The system of claim 1, further comprising:
a third current sensor residing at a third breaker position in the breaker panel, wherein the first value for the first virtual circuit is derived from both the first current measurement and the third current measurement.

7. The system of claim 1, wherein the at least power distribution element is a transfer switch.

8. The system of claim 7, further comprising:
a second transfer switch;
a third breaker panel electrically connected to the second transfer switch; and
an uninterruptable power supply, wherein the first transfer switch and the second transfer switch are electrically connected to the UPS and wherein an allocation value for the UPS is derived from the allocation value for the first transfer switch and an allocation value for the second transfer switch.

9. The system of claim 1, further comprising:
at least one sensor providing at least one of temperature and humidity information to the data center information manager, wherein the datacenter information manager provides the at least one of the temperature and humidity information to the display of the computing device.

* * * * *